US010673038B2

(12) United States Patent
Elsberry

(10) Patent No.: US 10,673,038 B2
(45) Date of Patent: Jun. 2, 2020

(54) BATTERY CELLS FOR BATTERY PACKS IN ELECTRIC VEHICLES

(71) Applicant: SF Motors, Inc., Santa Clara, CA (US)

(72) Inventor: Jeremy Andrew Elsberry, Santa Clara, CA (US)

(73) Assignees: CHONGQING JINKANG NEW ENERGY VEHICLE CO., LTD., Chongqing (CN); SF MOTORS, INC., Santa Clara, CA (US)

( * ) Notice: Subject to any disclaimer, the term of this patent is extended or adjusted under 35 U.S.C. 154(b) by 204 days.

(21) Appl. No.: 15/988,727

(22) Filed: May 24, 2018

(65) Prior Publication Data

US 2019/0296281 A1   Sep. 26, 2019

Related U.S. Application Data

(60) Provisional application No. 62/647,579, filed on Mar. 23, 2018.

(51) Int. Cl.
*H01M 2/02* (2006.01)
*H01M 2/10* (2006.01)
(Continued)

(52) U.S. Cl.
CPC .......... *H01M 2/1077* (2013.01); *B60L 50/66* (2019.02); *H01M 2/028* (2013.01);
(Continued)

(58) Field of Classification Search
CPC .. H01M 10/445; H01M 2/022; H01M 2/0408; H01M 2/0417; H01M 2/0421
See application file for complete search history.

(56) References Cited

U.S. PATENT DOCUMENTS

| 2011/0008654 A1 | 1/2011 | Kim | H01M 2/022 |
| | | | 429/56 |
| 2012/0003519 A1 | 1/2012 | Gu | H01M 2/022 |
| | | | 429/82 |

(Continued)

FOREIGN PATENT DOCUMENTS

| CN | 201274299 | 7/2009 |
| JP | 2000-323107 | 11/2000 |
| JP | 5377128 | 2/2011 |

OTHER PUBLICATIONS

International Search Report and Written Opinion for PCT/CN2018/101905 dated Nov. 29, 2018.

*Primary Examiner* — Jeremiah R Smith
(74) *Attorney, Agent, or Firm* — Foley & Lardner LLP

(57) ABSTRACT

Provided herein are battery cells for battery packs in electric vehicles. A battery cell can include a housing. The housing can have a body region, a neck region, and a head region. The body region can include an electrolyte, anode, and cathode. The battery cell can include a sealing element disposed in the head region. The battery cell can include two conductive layers and an insulation layer disposed within the sealing element. The first conductive layer can include a positive terminal to couple with a first wire connected to the cathode. The first conductive layer can define a first opening to pass a second wire. The second conductive layer can include a negative terminal to couple with the second wire connected to the anode. The second conductive layer can define a second opening to pass the first wire. The insulation layer can be disposed between the two conductive layers.

20 Claims, 13 Drawing Sheets

(51) Int. Cl.
*H01M 2/08* (2006.01)
*H01M 2/30* (2006.01)
*H01M 2/34* (2006.01)
*H01M 10/615* (2014.01)
*H01M 10/625* (2014.01)
*H01M 10/653* (2014.01)
*H01M 10/657* (2014.01)
*B60L 50/60* (2019.01)
*H01M 2/06* (2006.01)
*H01M 2/04* (2006.01)
*H01M 10/44* (2006.01)

(52) U.S. Cl.
CPC ....... *H01M 2/0237* (2013.01); *H01M 2/0285* (2013.01); *H01M 2/0287* (2013.01); *H01M 2/08* (2013.01); *H01M 2/305* (2013.01); *H01M 2/345* (2013.01); *H01M 10/615* (2015.04); *H01M 10/625* (2015.04); *H01M 10/653* (2015.04); *H01M 10/657* (2015.04); *H01M 2/022* (2013.01); *H01M 2/0408* (2013.01); *H01M 2/0413* (2013.01); *H01M 2/0417* (2013.01); *H01M 2/0421* (2013.01); *H01M 2/06* (2013.01); *H01M 10/445* (2013.01); *H01M 2220/20* (2013.01)

(56) References Cited

U.S. PATENT DOCUMENTS

| | | | |
|---|---|---|---|
| 2014/0057160 A1 | 2/2014 | Davis | H01M 2/022 429/164 |
| 2014/0072842 A1 | 3/2014 | Liu | H01M 2/1288 429/54 |
| 2015/0155588 A1 | 6/2015 | Lu | H01M 2/06 429/180 |
| 2015/0364735 A1 | 12/2015 | Kohira | H01M 4/525 429/55 |
| 2017/0062774 A1 | 3/2017 | Reid | H01M 2/0426 |
| 2017/0092928 A1 | 3/2017 | Wakimoto | H01M 2/0262 |
| 2017/0149030 A1 | 5/2017 | Lee | H01M 2/026 |
| 2017/0301899 A1 | 10/2017 | Lee | H01M 2/022 |
| 2018/0097215 A1 | 4/2018 | Cho | H01M 2/14 |
| 2019/0393462 A1 | 12/2019 | Ji | H01M 2/1241 |

BATTERY CELLS FOR BATTERY PACKS IN ELECTRIC VEHICLES

CROSS-REFERENCES TO RELATED APPLICATIONS

This application claims priority under 35 U.S.C. § 119(e) to U.S. Provisional Application No. 62/647,579, filed Mar. 23, 2018, titled "BATTERY CELLS FOR BATTERY PACKS IN ELECTRIC VEHICLES," which is incorporated herein by reference in its entirety.

BACKGROUND

Batteries can include electrochemical cells to supply electrical power to various electrical components connected thereto. Such batteries can be installed in a vehicle such as an automobile to provide electrical energy to various electrical systems installed within the vehicle.

SUMMARY

The present disclosure is directed to batteries cells for battery packs in electrical vehicles. The disclosed battery cell can have both a positive terminal and a negative terminal on one end of the cell. Such a configuration allow for improvement in protection of the constituent component within the battery cell and consumption of time during the pack assembly process.

At least one aspect is directed to a battery cell of a battery pack for electric vehicles. The battery cell can include a housing. The housing can have a body region, a neck region, and a head region. The body region can include an electrolyte, a first electrode, and a second electrode. The battery cell can include a sealing element disposed in the head region and supported by a shoulder portion of the neck region. The battery cell can include a first conductive layer disposed within the sealing element. The first conductive layer can include a first polarity terminal to electrically couple with a first bonding element connected to the first electrode. The first conductive layer can define a first opening to pass a second bonding element. The battery cell can include a second conductive layer disposed within the sealing element. The second conductive layer can include a second polarity terminal to electrically couple with the second bonding element connected to the second electrode. The second conductive layer can define a second opening to pass the first bonding element. The second opening can be located in an offset position from the first opening. The battery cell can include an insulation layer disposed in at least part of a space defined by the first conductive layer, the second conductive layer, and the sealing element.

At least one aspect is directed to a method of providing battery cells for battery packs of electric vehicles. The method can include forming a housing for a battery cell including a body region, a neck region, and a head region. The method can include housing, within the body region, an electrolyte, a first electrode, and a second electrode. The method can include arranging a sealing element within the head region. The sealing element can be supported by a shoulder portion of the neck region. The method can include disposing a first conductive layer within the sealing element. The first conductive layer can include a first polarity terminal to electrically couple with a first bonding element connected to the first electrode. The first conductive layer can define a first opening to pass a second bonding element. The method can include disposing a second conductive layer within the sealing element. The second conductive layer can include a second polarity terminal to electrically couple with the second bonding element connected to the second electrode. The second conductive layer can define a second opening to pass the first bonding element. The second opening can be located in an offset position from the first opening. The method can include including an insulation layer in at least part of a space defined by the first conductive layer, the second conductive layer, and the sealing element.

At least one aspect is directed to a method of supplying battery cells for battery packs of electric vehicles. The method can include providing a battery cell. The battery cell can include a housing. The housing can have a body region, a neck region, and a head region. The body region can include an electrolyte, a first electrode, and a second electrode. The battery cell can include a sealing element disposed in the head region and supported by a shoulder portion of the neck region. The battery cell can include a first conductive layer disposed within the sealing element. The first conductive layer can include a first polarity terminal to electrically couple with a first bonding element connected to the first electrode. The first conductive layer can define a first opening to pass a second bonding element. The battery cell can include a second conductive layer disposed within the sealing element. The second conductive layer can include a second polarity terminal to electrically couple with the second bonding element connected to the second electrode. The second conductive layer can define a second opening to pass the first bonding element. The second opening can be located in an offset position from the first opening. The battery cell can include an insulation layer disposed in at least part of a space defined by the first conductive layer, the second conductive layer, and the sealing element.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings.

DETAILED DESCRIPTION

Figure 1:
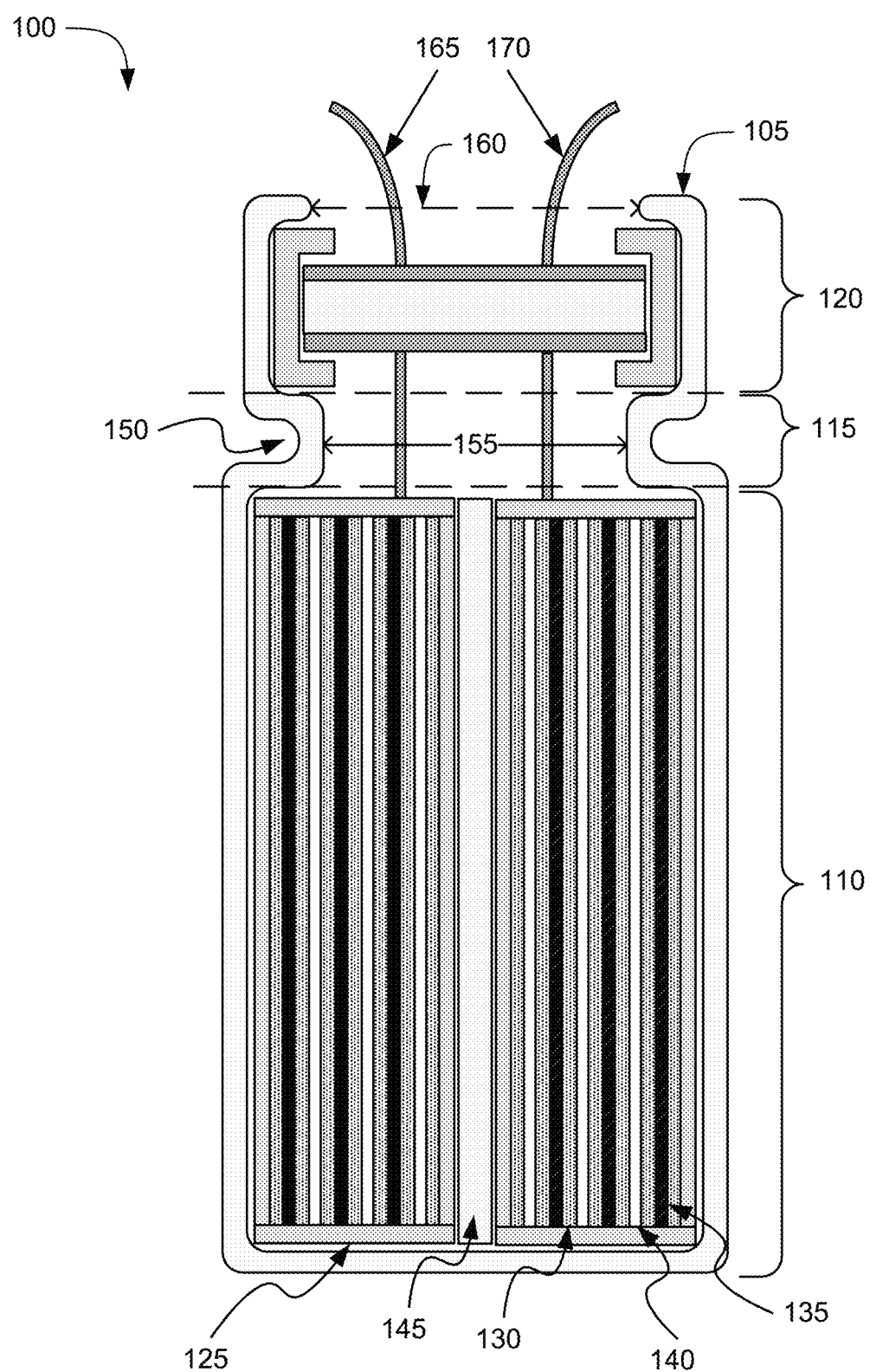
FIG. 1 is a block diagram depicting a cross-sectional view of an example battery cell for a battery pack in an electric vehicle.

Following below are more detailed descriptions of various concepts related to, and implementations of battery cells for battery packs in electric vehicles. The various concepts introduced above and discussed in greater detail below can be implemented in any of numerous ways.

Described herein are battery cells for battery packs in electric vehicles for an automotive configuration. An automotive configuration includes a configuration, arrangement or network of electrical, electronic, mechanical or electro-mechanical devices within a vehicle of any type. An automotive configuration can include battery cells for battery packs in electric vehicles (EVs). EVs can include electric automobiles, cars, motorcycles, scooters, passenger vehicles, passenger or commercial trucks, and other vehicles such as sea or air transport vehicles, planes, helicopters, submarines, boats, or drones. EVs can be fully autonomous, partially autonomous, or unmanned.

One architecture of a cylindrical lithium ion (or other type of) battery cell can be include a deep-drawn metal cylinder casing and a protective cap at the top end. The protective cap can include devices to prevent against fires and explosions. Electrical current can flow from an anode housed within the casing to an anode tab and then through the casing itself via a bonded wire connection. In this manner, the casing of the battery cell can function as the negative terminal. The positive terminal of the battery cell can be on a lateral (e.g., top) end of the structure, and can include a lid. The lid can include a current interrupt device (CID), a rupture disk, and a gasket. The lid can reside within the gasket. The sealing element can insulate the positive terminal from the negative terminal of the battery cell.

This construction can pose a problem from the perspective of pack assembly in EV settings. Each battery cell can be attached to a negative busbar by bonding a wire between a crimped area of the casing and the negative busbar and to a positive busbar by bonding another wire between a table top and the positive busbar. Connecting the wires to the crimped area of the battery cell in this manner can be challenging, as there can be very little flat or otherwise bondable area for a wire to bond to. Each battery cell can also be attached to the negative busbar by bonding one wire to a bottom or side of the battery cell and to the positive busbar by bonding another wire to a top of the battery cell. Bonding to both ends of the battery cell can involve setting up specialized production lines to bond wires in this fashion. In either case, all the battery cells once installed in a battery pack can be insulated electrically from a collecting plate, as the casing for each battery cell can be electrically conductive to function as the negative terminal.

To address these and other technical drawbacks, the battery cell described herein can include both the positive terminal and the negative terminal disposed at a same lateral end (e.g., the top end) of the battery cell. For example, a portion of the battery cell near the lateral end can include two conductive discs arranged in an array with an electrically insulative material inserted between the two discs. Each conductive disc can include a hole to pass an electrical bonding wire and a contact to form one of the terminals for the battery. The holes on the two conductive discs can be offset to be out of phase about the length of the battery cell (e.g., by 180 degrees). A sealing element (e.g., a compliant gasket) can be placed toward one end of the battery cell to hold the two conductive discs and to insulate the discs from the outer casing of the battery cell. Each conductive disc can also include a divot, groove, or a score mark to allow pressure from within the battery cell to vent during a runway failure event. This score mark can be curved, for example.

Having both tabs for the positive and the negative terminals on one end of the battery cell can eliminate wire bonding to one side of the battery pack and welding of a tab to another side of the battery cell (e.g., the bottom end or the crimped region). In this manner, a terminal or an electrode tab along the bottom of the battery cell can be eliminated from the structure. Additionally, the amount of flat bond pad area along the top end of the battery cell can be enlarged, thus improving the pack assembly process by making it easier to bond the wire to each tab. Furthermore, the flexibility of casing material selection can allow for the casing to include non-conductive material, thus permitting direct contact between the battery cell and a thermoelectric plate to cool the battery cell at a faster rate and elongating the lifespan of the battery cell. The lid for the battery cell can also be made thinner, thereby allowing for more active cell material in the battery cell.

Referring to FIG. 1, among others, depicted is a cross-sectional view of a battery cell 100 for a battery pack in an electric vehicle. The battery cell 100 can be a lithium-air battery cell, a lithium ion battery cell, a nickel-zinc battery cell, a zinc-bromine battery cell, a zinc-cerium battery cell, a sodium-sulfur battery cell, a molten salt battery cell, a nickel-cadmium battery cell, or a nickel-metal hydride battery cell, among others. The battery cell 100 can include a housing 105. The housing 105 can be contained in a battery pack (e.g., a battery array or battery module) installed a chassis of an electric vehicle. The housing 105 can have the shape of a cylindrical casing or cylindrical cell with a circular, ovular, or elliptical base, as depicted in the example of the battery cell of FIG. 1. A height of the housing 105 can be greater than a diameter of the housing 105. For example, the housing 105 can have a length (or height) of 65-75 mm and a maximum width (or diameter for circular examples) of 17-30 mm. In some examples the width or diameter of the housing 105 can be greater than the length (e.g., height) of the housing 105. The housing 105 can be formed from a prismatic casing with a polygonal base, such as a triangle, square, a rectangular, a pentagon, or a hexagon, for example.

A height of such a prismatic cell housing 105 can be less than a length or a width of the base of the housing 105.

The housing 105 of the battery cell 100 can include at least one electrically or thermally conductive material, or combinations thereof. The electrically conductive material can also be a thermally conductive material. The electrically conductive material for the housing 105 of the battery cell 100 can include a metallic material, such as aluminum, an aluminum alloy with copper, silicon, tin, magnesium, manganese or zinc (e.g., of the aluminum 1000, 4000, or 5000 series), iron, an iron-carbon alloy (e.g., steel), silver, nickel, copper, and a copper alloy, among others. The electrically conductive material and thermally conductive material for the housing 105 of the battery cell 100 can include a conductive polymer. To evacuate heat from inside the battery cell 100, the housing 105 can be thermally coupled to a thermoelectric heat pump (e.g., a cooling plate) via an electrically insulative layer. The housing 105 can include an electrically insulative material. The electrically insulative material can be a thermally conductive material. The electrically insulative and thermally conductive material for the housing 105 of the battery cell 100 can include a ceramic material (e.g., silicon nitride, silicon carbide, titanium carbide, zirconium dioxide, beryllium oxide, and among others) and a thermoplastic material (e.g., polyethylene, polypropylene, polystyrene, polyvinyl chloride, or nylon), among others. To evacuate heat from inside the battery cell 100, the housing 105 can be thermally coupled to a thermoelectric heat pump (e.g., a cooling plate). The housing 105 can be directly thermally coupled to the thermoelectric heat pump without an addition of an intermediary electrically insulative layer.

The housing 105 of the battery cell 100 can include a body region 110, a neck region 115, and a head region 120. The body region 110, the neck region 115, and the head region 120 can be defined along one axis of the housing 105. In the example depicted in FIG. 1, among others, the body region 110, the neck region 115, and the head region 120 can be defined along a vertical (or longitudinal) axis of cylindrical casing forming the housing 105. The body region 110, the neck region 115, and the head region 120 can be defined by an inner surface and an outer surface of the housing 105. The body region 110 can be at one end of the housing 105 (e.g., a bottom end as depicted in FIG. 1). The end of the body region 110 can encapsulate or cover the corresponding end of the housing 105. The head region 120 can be at an opposite end of the housing 105 (e.g., a top end as depicted in FIG. 1). The neck region 115 can be between the body region 110 and the head region 120.

The body region 110 can house or include a container 125 to store or hold electrochemical cells. The container 125 can correspond to the body region 110 of the housing 105. The container 125 can be defined by an inner surface of the body region 110 of the housing 105. The container 125 can be a casing separate from the housing 105 for holding the electrochemical cells of the battery cell 100. The container 125 can hold, house, store, or otherwise include electrodes and electrolytes. The container 125 can be a cylindrical casing with a circular, ovular, or elliptical base. A height of the cylindrical casing can be greater than a diameter of the cylindrical casing. The diameter of the cylindrical case can be greater than the height of the cylindrical casing. The container 125 can be a prismatic casing with a polygonal base, such as a triangle, square, a rectangular, a pentagon, or a hexagon, for example. A height of the prismatic cell for the container 125 can be less than a length or a width of the base of the prismatic cell. The height of the prismatic cell for the container 125 can be greater than the length or the width of the base of the prismatic cell. The container 125 can also form or define a hollowing or hollow area along at least one axis of the housing 105 for the battery cell 100.

The container 125 can include one or more separators 130. Each separator 130 can include a permeable membrane separating the cathode 135 and the anode 140. The one or more separators 130 can be formed of, contain, or include the electrolyte. The electrolyte can include any electrically conductive solution, dissociating into ions (e.g., cations and anions). For an lithium-ion battery cell, for example, the electrolyte of the one or more separators 130 can include a liquid electrolyte, such as lithium bisoxalatoborate ($LiBC_4O_8$ or LiBOB salt), lithium perchlorate ($LiClO_4$), lithium hexaflourophosphate ($LiPF_6$), and lithium trifluoromethanesulfonate ($LiCF_3SO_3$). The electrolyte of the separator 130 can include a polymer electrolyte, such as polyethylene oxide (PEO), polyacrylonitrile (PAN), poly (methyl methacrylate) (PMMA) (also referred to as acrylic glass), or polyvinylidene fluoride (PVdF). The electrolyte of the one or more separators 130 can include a solid-state electrolyte, such as lithium sulfide ($Li_2S$), magnesium, sodium, and ceramic materials (e.g., beta-alumna). The one or more separators 130 can be formed of, contain, or include a solvent to hold the electrolyte, such as dimethyl carbonate ($C_3H_6O_3$), diethyl carbonate ($C_5H_{10}O$), propylene carbonate ($C_4H_6O_3$), methyl propylene carbonate ($C_5H_{10}O_3$), and tetrahydrofuran ($C_4H_8O$), among others.

The container 125 can include one or more cathodes 135 and one or more anodes 140. The cathodes 135 and the anodes 140 can be generally referred to as electrodes. Each cathode 135 and anode 140 can be separated or divided from each other by one of the separators 130. The one or more separators 130, the one or more cathodes 135, and the one or more anodes 140 can be arranged in a stack formation. The cathodes 135 can include any substance through which electrical current flows out of the electrolyte in the separators 130. The anodes 140 can include any substance through which electrical current flows into the electrolyte in the separators 130. For a lithium-ion cell, for example, the one or more cathodes 135 can include a lithium-metal oxide (e.g., lithium cobalt oxide ($LiCoO_2$) and lithium manganese oxide ($LiMn_2O_4$)), a vanadium oxide, (e.g., VO) or an olivine (e.g., $LiFePO_4$), among others. The one or more anodes 140 can include carbonaceous materials (e.g., graphites, carbon fibers, active carbons, and carbon blacks), lithium titanium oxide ($Li_4Ti_5O_{12}$), a metal alloy (e.g., using aluminum, bismuth, antimony, zinc, magnesium, copper, iron, nickel, etc.) or a composite including metal and carbonaceous materials.

The body region 110 can also include a center support 145 defined by the container 125. The center support 145 can be included or inserted into the hollowing defined by the container 125. The hollowing can be defined by the container 125 can be or include the center support 145. The center support in the hollowing can be any structure or member to wrap around the one or more separators 130, the one or more cathodes 135, and the one or more anodes 140 in stack formation. The center support 145 can include an electrically insulative material, and the center support 145 can function neither as the positive terminal nor the negative terminal for the battery cell 100. The container 125 can also lack or not include the center support 145, and the container 125 along with the one or more separators 130, the one or more cathodes 135, and the one or more anodes 140 can span the full dimensions of the body region 110.

The neck region 115 (sometimes referred to herein as a "crimped region") can include any part of the housing 105 separating the body region 110 from the head region 120. The neck region 115 can include or be defined by an indentation 150 protruding between the body region 110 and the head region 120. The indentation 150 of the neck region 115 can be formed by crimping, squeezing, or applying any pressure on an outer surface of the housing 105 along one axis. The neck region 115 can have a width 155 less than a width of the body region 110 and a width of the head region 120. For example, the width (or diameter in circular examples) of the neck region 115 can be 5-20 mm, the width (or diameter in circular examples) of the body region 110 can be 15-30 mm, and the width (or diameter in circular examples) of the head region 120 can be 15-30 mm. The width 155 can correspond to a shortest dimension along an inner surface of the housing 105 within the neck region 115. The width 155 can correspond to a width of a rectangular or polygonal lateral area of the neck region 115. The width 155 can correspond to a diameter of a circular or elliptical lateral area of the neck region 115. The lateral area of the neck region 115 can also be less than a lateral area of the head region 120 and a lateral area of the body region 110. The width of the head region 120 can be less than the width of the body region 110 but greater than the width 155 of the neck region 115. The lateral area of the head region 120 can be less than the lateral area of the body region 110 but greater than the lateral area of the neck region 115.

The head region 120 can correspond to a part of the housing 105 for the battery cell 100 from the neck region 115 to one end of the housing 105 (e.g., the top end as depicted in FIG. 1). The head region 120 can correspond to the part of the housing 105 from one end of the indentation 150 of the neck region 115 to the top end of the housing 105. The end of the housing 105 can be an opening 160 defined by an inner surface of the head region 120. The end of the housing 105 can protrude inward forming the opening 160 to hold the components housed within the head region 120 as detailed herein in connection with FIG. 2, among others. The width of the opening 160 can be less than the width 155 of the neck region 115. The width of the opening 160 can be substantially (e.g., within 10%) equal to the width 155 of the neck region 115.

The battery cell 100 can include a first bonding element 165 and a second bonding element 170 for forming the polarity terminals of the battery cell 100. Each bonding element 165 and 170 can extend from the container 125 of the body region 110 through the neck region 115 to the head region 120 of the battery cell 100. Each bonding element 165 and 170 can include an electrically conductive wire to form the corresponding polarity terminal of the battery cell 100. Each bonding element 165 and 170 can be bonded, joined, attached, soldered, welded, connected, or otherwise electrically coupled to at least one of the cathodes 135 and anodes 140 housed in the body region 110. The first bonding element 165 can correspond to a positive terminal for the battery cell 100, and can electrically couple the positive terminal to one of the cathodes 135 housed in the body region 110. The second bonding element 170 can correspond to a negative terminal for the battery cell 100, and can be electrically couple the negative terminal for the battery cell 100 to one of the anodes 140 housed in the body region 110. Conversely, the first bonding element 165 can correspond to a negative terminal for the battery cell 100, and can electrically couple the negative terminal to one of the anodes 140 housed in the body region 110. The second bonding element 170 can correspond to a positive terminal for the battery cell 100, and can be electrically couple the positive terminal for the battery cell 100 to one of the cathodes 135 housed in the body region 110. The first bonding element 165 and the second bonding element 170 can be bonded, joined, attached, soldered, welded, or otherwise connected to the components within the head region 120 detailed below in conjunction with FIG. 2, among others. The first bonding element 165 and the second bonding element 170 can pass through the opening 160 defined by one end of the head region 120.

The first bonding element 165 and the second bonding element 170 can couple a corresponding electrode housed in the body region 110 to an electrical power distribution system of the electrical vehicle. The electrical power distribution system can include a busbar or current collector for each electrical polarity or a current collector for each electrical polarity. Each bonding element 165 and 170 can couple the corresponding electrode housed in the body region 110 to the corresponding busbar or a current collector for the electrical vehicle. The first bonding element 165 can correspond to the positive terminal for the battery cell 100, and can electrically couple one of the cathodes 135 housed in the body region 110 to a positive polarity busbar or a positive polarity current collector. The second bonding element 170 can correspond to a negative terminal for the battery cell 100, and can be electrically couple one of the anodes 140 housed in the body region 110 to a negative polarity busbar or a negative polarity current collector. Conversely, the first bonding element 165 can correspond to a negative terminal for the battery cell 100, and can electrically couple one of the anodes 140 housed in the body region 110 to a negative polarity busbar or a negative polarity current collector. The second bonding element 170 can correspond to a positive terminal for the battery cell 100, and can be electrically couple one of the cathodes 135 housed in the body region 110 to a positive polarity busbar or a positive polarity current collector.

Figure 2:
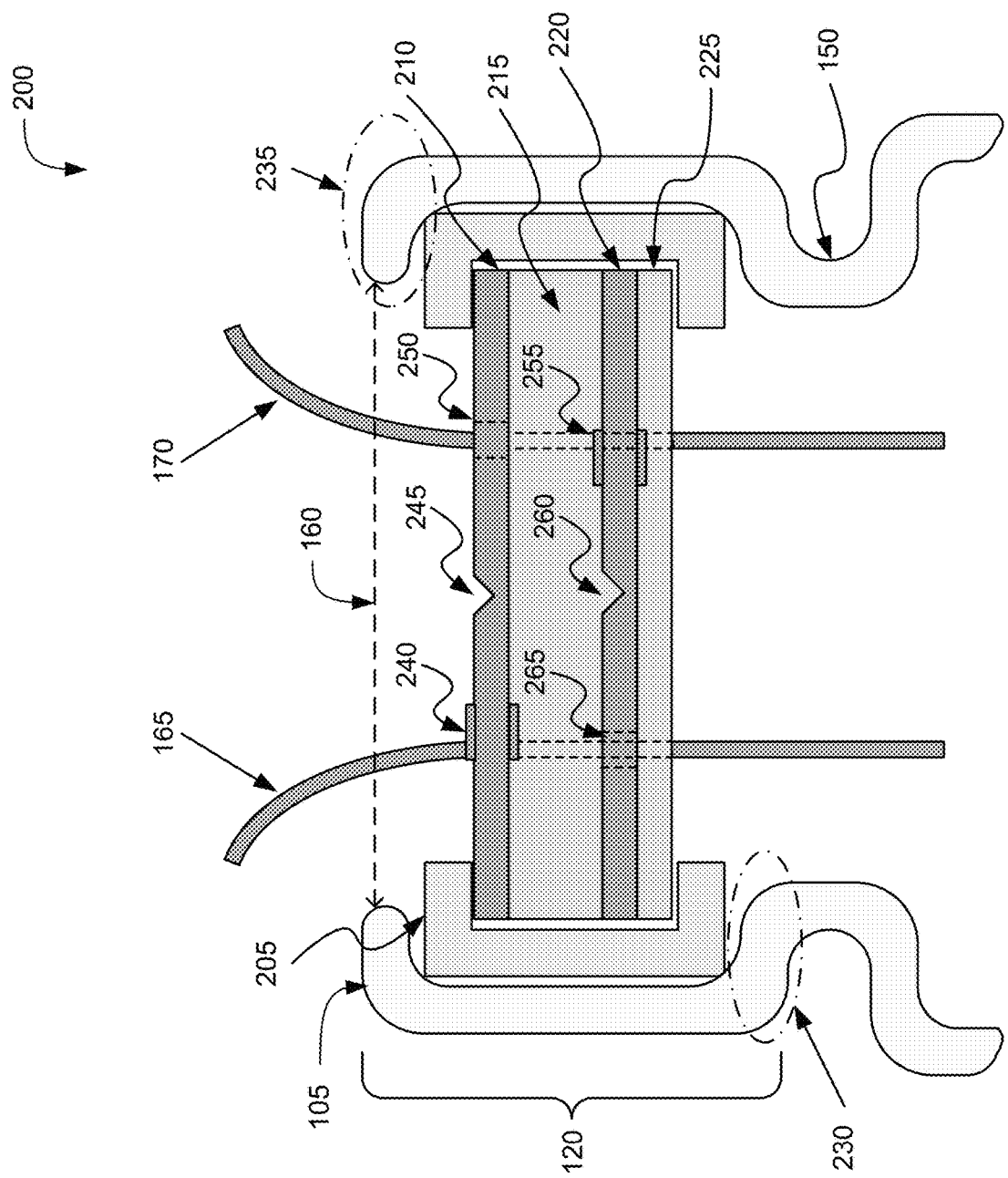
FIG. 2 is a block diagram depicting a cross-sectional view of an example of a head region of a battery cell for a battery pack in an electric vehicle.

Referring to FIG. 2, depicted is a cross-sectional view 200 of the head region 120 of the battery cell 100 for the battery pack in the electric vehicle. The head region 120 can house, contain, store, hold, or otherwise include at least one sealing element 205, at least one first conductive layer 210, at least one first insulation layer 215, at least one second conductive layer 220, and at least one second insulation layer 225, among other components. The head region 120 can include a protector, detailed herein in conjunction with FIG. 3, among others. The first conductive layer 210, the first insulation layer 215, the second conductive layer 220, and the second insulation layer 225 can each be disposed, fixed, arranged, positioned, or otherwise included in the sealing element 205. The protector can also be disposed, fixed, arranged, positioned, or otherwise included in the sealing element 205. The open end formed by the opening 160 of the head region 120 can be capped, enveloped, or enclosed with a covering, detailed herein in conjunction with FIGS. 7-9, among others. The head region 120 can pass the first bonding element 165 and the second bonding element 170 extending from the body region 110 and through the neck region 115 of the housing 105.

The sealing element 205 (sometimes referred to as a lid or a lid assembly) can form a seal across an inner surface of head region 120 of the housing 105 to retain the materials and components contained within the housing 105. The sealing element 205 can house, retain, hold, secure, seal, or otherwise include the first conductive layer 210, the first insulation layer 215, the second conductive layer 220, and the second insulation layer 225. The sealing element 205 can be a gasket, a washer, an O-ring, a cap, a fitting, a hose coupling, or any other component to house, retain, hold, secure, or seal the first conductive layer 210, the first insulation layer 215, the second conductive layer 220, and the second insulation layer 225. The sealing element 205 can form the seal across the opening 160 formed by the open end of the head region 120 of the housing 105 to retain the container 125, the separators 130, the cathodes 135, the anodes 140, the sealing element 205, the first conductive layer 210, the first insulator layer 215, the second conductive layer 220, and the second insulator layer 225, among others, contained within the housing 105. The seal formed by the sealing element 205 can include any type of mechanical seal, such as a hermetic seal, an induction seal, a hydrostatic seal, a hydrodynamic seal, and a bonded seal, among others. The sealing element 205 can include electrically insulative material to electrically isolate the first conductive layer 210 from the second conductive layer 220. The sealing element 205 can include thermally conductive material to allow heat to evacuate from the body region 110. A length of the sealing element 205 can be 17-30 mm. A width (or a diameter for circular examples) of the sealing element 205 can be 17-30 mm. A height or thickness of the sealing element 205 can be 2-5 mm.

The sealing element 205 can be positioned on, adjacent or proximate to (e.g., within 1 mm of) or be at least partially supported by a shoulder portion 230 of the neck region 115 of the housing 105. The indentation 150 can define the shoulder portion 230 for supporting the sealing element 205. The shoulder portion 230 can contact at least part of the sealing element 205 to fix or maintain a position of the sealing element 205. The shoulder portion 230 can correspond to at least a portion of one surface of the indentation 150 of the neck region 115. For example, as depicted in FIGS. 1 and 2, among others, the sealing element 205 can be situated on a top surface of the indentation 150 of the neck region 115. The shoulder portion 230 can be an integral element of the housing 105 formed by a crimping process. The shoulder portion 230 can be partially or fully in contact with the sealing element 205 in an assembled position. The shoulder portion 230 can also be distanced from, separated from, or otherwise not in direct contact with the sealing element 205. The sealing element 205 can be retained or at least partially held in the head region 120 of the housing 105 by a part of a lip portion 235. The lip portion 235 can correspond to any portion of the head region 120 of the housing 105 at the opening 160 protruding inward. For example, as depicted in FIG. 2, the sealing element 205 can be held in the housing 105 by the lip portion 235 and supported by the shoulder portion 230. An outer surface of the sealing element 205 can be at least in partial contact with the inner surface of the housing 105 in the head region 120. The outer surface of the sealing element can be in contact with at least the lip portion 235 of the head region 120. The sealing element 205 can be retained in the head region 120 of the housing 105 without the lip portion 235. The sealing element 205 can reside on top of the head region 120 spanning the opening 160.

The first conductive layer 210 can be disposed, fixed, arranged, positioned, or otherwise included in the sealing element 205. The first conductive layer 210 can be disposed, fixed, or positioned within the sealing element 205 to be fully or substantially (e.g., within 10 degrees of) parallel with the second conductive layer 220. The first conductive layer 210 can be positioned within the sealing element 205 toward the top end of the sealing element 205. The first conductive layer 210 can be positioned along the opening 160 of the head region 120 of the housing 105. The first conductive layer 210 can be disposed within the sealing element 205 above the first insulation layer 215. The first conductive layer 210 can be held into the sealing element 205 by a top lip of the sealing element 205. The first conductive layer 210 can include any electrically conductive material, such as aluminum, an aluminum alloy with copper, silicon, tin, magnesium, manganese or zinc (e.g., of the aluminum 1000,4000, or 5000 series), iron, an iron-carbon alloy (e.g., steel), silver, nickel, copper, and a copper alloy, among others. A shape of the first conductive layer 210 can correspond or match the shape of the base of the housing 105 or the second conductive layer 220. The shape of the first conductive layer 210 can be a triangular, rectangular, pentagonal, elliptical, and circular, among other shapes. A length of the first conductive layer 210 can be 17-30 mm. A width (or a diameter for circular examples) of the first conductive layer 210 can be 17-30 mm. A height or thickness of the first conductive layer 210 can be 3-5 mm. The dimensions and shape of the first conductive layer 210 can be the same as dimensions and shape of the second conductive layer 220. The dimensions and shape of the first conductive layer 210 can differ as the dimensions and the shape of the second conductive layer 220. For example, the first conductive layer 210 can be an elliptical disk, whereas the second conductive layer 220 can be a hexagonal disk.

The first conductive layer 210 can include a first polarity terminal for the battery cell 100. The first conductive layer 210 can function as a positive polarity terminal or a negative polarity terminal. The first conductive layer 210 can have a polarity opposite of the second conductive layer 220. The first conductive layer 210 can be bonded, joined, attached, soldered, welded, connected, or otherwise be electrically coupled to the first bonding element 165. The first conductive layer 210 can electrically couple with the first bonding element 165 connected to a first electrode (e.g., one of the cathodes 135 or one of the anodes 140). The first bonding element 165 can be connected to one of the cathodes 135 housed in the body region 110 of the battery cell 100. The first conductive layer 210 electrically coupled to the cathode 135 via the first bonding element 165 can be the positive polarity terminal. The first bonding element 165 can be connected to one of the anodes 140 housed in the body region 110 of the battery cell 100. The first conductive layer 210 electrically coupled to the anode 140 via the first bonding element 165 can be the negative polarity terminal. The first conductive layer 210 can electrically couple with the vehicle electrical distribution system (e.g., a busbar or a current collector) via the first bonding element 165.

The first conductive layer 210 can define or have a first contact area 240. The first contact area 240 can be bonded, joined, attached, soldered, welded, connected, or otherwise electrically coupled to the first bonding element 165. The first contact area 240 can electrically couple the first bonding element 165 to the first conductive layer 210. The first contact area 240 can electrically couple the electrode connected to the first bonding element 165 to the first conductive layer 210. The first bonding element 165 can be connected to one of the cathodes 135 housed in the body region 110 of the battery cell 100. The first contact area 240 can be electrically coupled to the cathode 135 via the first bonding element 165. The electrical coupling with the cathode 135 via the first contact area 240 and the first bonding element 165 can allow the first conductive layer 210 to function as the positive terminal. The first bonding element 165 can be connected to one of the anodes 140 housed in the body region 110 of the battery cell 100. The first contact area 240 can be electrically coupled to the anode 140 via the first bonding element 165. The electrical coupling with the anode 140 via the first contact area 240 and the first bonding element 165 can allow the first conductive layer 210 to function as the negative terminal. The first contact area 240 can be formed along one or both lateral surfaces of the first conductive layer 210. The first contact area 240 can include the same material as the first conductive layer 210. The first contact area 240 can be formed from the first conductive layer 210. The first contact area 240 can include an electrically conductive material bonded, joined, attached, soldered, welded, connected, or otherwise be electrically coupled to both the first conductive layer 210 and the first bonding element 165. The first contact area 240 can be positioned away from a center of the first conductive layer 210.

The first contact area 240 defined or included on the first conductive layer 210 can at least partially fracture or open in a failure condition within the housing 105. The failure condition can include a significant increase in heat or a buildup of excessive pressure from within the housing 105 among others (e.g., the container 125 housing the electrolyte in the separators 130, cathodes 135, and anodes 140). The first contact area 240 can be defined along one or both surfaces of the first conductive layer 210 as a groove, divot, or indentation into the corresponding surface. The first contact area 240 can correspond to along a weakened or a softened portion of the first conductive layer 210. Once at least partially pressured or opened, the first contact area 240 can relieve, alleviate, or lessen effects of the failure condition. For example, the first contact area 240 can reduce the temperature or pressure from within the housing 105.

The first conductive layer 210 can define a first opening 250 to pass the second bonding element 170. In this manner, both the positive terminal and the negative terminal can be along one side of the housing 105 of the battery cell 100 through the opening 160. The first opening 250 can be a hole, aperture, or any other spacing extending from one end of the first conductive layer 210 to the other end of the first conductive layer 210. The first opening 250 can be formed through the first conductive layer 210 to pass the second bonding element 170 from the body region 110 through the neck region 115, the head region 120 of the housing 105, and the opening 160. The first opening 250 can located away from a center of the first conductive layer 210. For example, as depicted in FIG. 1, the first opening 250 can include a hole extending through the first conductive layer 210 along a vertical axis of the housing 105. The second bonding element 170 passing through the first opening 250 can be connected to one of the cathodes 135. The first opening 250 can include, function, or act as an outlet for the positive terminal for the battery cell 100 defined by the second bonding element 170 connected to the cathode 135. The second bonding element passing through the first opening 250 can be connected to one of the anode 140. The first opening 250 can include, function, or act as an outlet for the positive terminal for the battery cell 100 defined by the second bonding element 170 connected to the anode 140. At least part of the first opening 250 can include an electrically insulative material to electrically separate the second bonding element 170 from the first conductive layer 210. The first opening 250 can include or contain a portion of the first insulation layer 215 extending from the top plane of the first insulation layer 215 past the bottom plane of the first conductive layer 210.

The first conductive layer 210 can define at least one first notch 245. Each first notch 245 can be configured to at least partially fracture or open in a failure condition within the housing 105. The failure condition can include a significant increase in heat or a buildup of excessive pressure from within the housing 105 among others (e.g., the container 125 housing the electrolyte in the separators 130, cathodes 135, and anodes 140). Each first notch 245 can include a groove, divot, or indentation along at least one surface of the first conductive layer 210. Each first notch 245 can be defined along a top surface of the first conductive layer 210 (e.g., as depicted in FIG. 1). Each first notch 245 can be defined along a bottom surface of the first conductive layer 210. A subset of the first notches 245 can be along the top surface of the first conductive layer 210. Another subset of the first notches 245 can be along the bottom surface of the first conductive layer 210. At least some part of the first notches 245 along the bottom surface of the first conductive layer 210 can include or contain a portion of the first insulation layer 215 extending from the top plane of the first insulation layer 215 past the bottom plane of the first conductive layer 210. Each first notch 245 defined by the first conductive layer 210 can extend across a longitudinal axis across one of the surfaces of the first conductive layer 210. Each first notch 245 defined by the first conductive layer 210 can extend across a latitudinal axis across one of the surfaces of the first conductive layer 210. The shape of each first notch 245 can be prismatic spacing with a triangular, rectangular, pentagonal, semi-elliptical, and semi-circular, among other shapes for the base.

The first insulation layer 215 can be disposed in at least part of a space defined by the sealing element 205, the first conductive layer 210, and the second conductive layer 220. The first insulation layer 215 can electrically insulate the first conductive layer 210 from the second conductive layer 220, and vice-versa. The first insulation layer 215 can include spacing to pass or fit the first bonding element 165 and the second bonding element 170. The first insulation layer 215 can partially or fully span the volume defined by the sealing element 205, the first conductive layer 210, and the second conductive layer 220. A top plane of the first insulation layer 215 can be in contact or be flush with a bottom plane of the first conductive layer 210. A bottom plane of the first insulation layer 215 can be in contact or be flush with a top plane of the second conductive layer 220. A longitudinal plane of the first insulation layer 215 can be in contact or be flush with the inner surface of sealing element 205. The first insulation layer 215 can include any electrically insulative material or dielectric material, such as air, nitrogen, sulfur hexafluoride ($SF_6$), ceramic, glass, and plastic (e.g., polysiloxane), among others. A shape of the first insulation layer 215 can correspond or match the shape of the base of the housing 105, first conductive layer 210, the second conductive layer 220, or the second insulation layer 225. The shape of the first insulation layer 215 can be triangular, rectangular, pentagonal, elliptical, or circular, among other shapes. A length of the second first insulation layer 215 can be 5-30 mm. The length of the first insulation layer 215 can be greater than the length of the first conductive layer 210 or the second conductive layer 220. A width (or a diameter in circular examples) of the first insulation layer 215 can be 5-30 mm. The width (or the diameter) of the first insulation layer 215 can be greater than the width (or the diameter) of the first conductive layer 210 or the second conductive layer 220. A height or thickness of the first insulation layer 215 can be 0.1-7 mm. The dimensions and shape of the first insulation layer 215 can be the same as dimensions and shape of the second insulation layer 225.

The dimensions and shape of the first insulation layer 215 can differ as the dimensions and the shape of the second insulation layer 225.

The second conductive layer 220 can be disposed, fixed, arranged, positioned, or otherwise included in the sealing element 205. The second conductive layer 220 can be disposed, fixed, or positioned within the sealing element 205 to be fully or substantially parallel with the first conductive layer 210 (e.g., within 10 degrees). The second conductive layer 220 can be positioned within the sealing element 205 toward the bottom end of the sealing element 205. The second conductive layer 220 can be positioned toward the neck region 115 of the housing 105. The second conductive layer 220 can be disposed within the sealing element 205 above the second insulation layer 225. The second conductive layer 220 can held into the sealing element 205 by the second insulation layer 225. The second conductive layer 220 can be held into the sealing element 205 by a bottom lip of the sealing element 205 supporting the second conductive layer 220. The second conductive layer 220 can include any electrically conductive material, such as aluminum, an aluminum alloy with copper, silicon, tin, magnesium, manganese or zinc (e.g., of the aluminum 4000 or 5000 series), iron, an iron-carbon alloy (e.g., steel), silver, nickel, copper, and a copper alloy, among others. A shape of second conductive layer 220 can correspond or match the shape of the base of the housing 105 or the first conductive layer 210. The shape of the second conductive layer 220 can be a triangular, rectangular, pentagonal, elliptical, and circular, among other shapes. A length of the second conductive layer 220 can be 17-30 mm. A width (or a diameter in circular examples) of the second conductive layer 220 can be 17-30 mm. A height or thickness of the second conductive layer 220 can be 3-5 mm. The dimensions and shape of the second conductive layer 220 can be the same as dimensions and shape of the first conductive layer 210. The dimensions and shape of the second conductive layer 220 can differ as the dimensions and the shape of the first conductive layer 210.

The second conductive layer 220 can include a second polarity terminal for the battery cell 100. The second conductive layer 220 can function as a positive polarity terminal or a negative polarity terminal. The second conductive layer 220 can have a polarity opposite of the first conductive layer 210. The second conductive layer 220 can be bonded, joined, attached, soldered, welded, connected, or otherwise be electrically coupled to the second bonding element 170. The second conductive layer 220 can electrically couple with the second bonding element 170 connected to a first electrode (e.g., one of the cathodes 135 or one of the anodes 140). The second bonding element 170 can be connected to one of the cathodes 135 housed in the body region 110 of the battery cell 100. The second conductive layer 220 electrically coupled to the cathode 135 via the second bonding element 170 can be the positive polarity terminal. The second bonding element 170 can be connected to one of the anodes 140 housed in the body region 110 of the battery cell 100. The second conductive layer 220 electrically coupled to the anode 140 via the second bonding element 170 can be the negative polarity terminal. The second conductive layer 220 can electrically couple with the vehicle electrical distribution system (e.g., a busbar or a current collector) via the second bonding element 170.

The second conductive layer 220 can define or have a second contact area 255. The second contact area 255 can be bonded, joined, attached, soldered, welded, connected, or otherwise be electrically coupled to the second bonding element 170. The second contact area 255 can electrically couple the second bonding element 170 to the second conductive layer 220. The second contact area 255 can electrically couple the electrode connected to the second bonding element 170 to the second conductive layer 220. The second bonding element 170 can be connected to one of the cathodes 135 housed in the body region 110 of the battery cell 100. The second contact area 255 can be electrically coupled to the cathode 135 via the second bonding element 170. The electrical coupling with the cathode 135 via the second contact area 255 and the second bonding element 170 can allow the second conductive layer 220 to function as the positive terminal. The second bonding element 170 can be connected to one of the anodes 140 housed in the body region 110 of the battery cell 100. The second contact area 255 can be electrically coupled to the anode 140 via the second bonding element 170. The electrical coupling with the anode 140 via the second contact area 255 and the second bonding element 170 can allow the second conductive layer 220 to function as the negative terminal. The second contact area 255 can be formed along one or both lateral surfaces of the second conductive layer 220. The second contact area 255 can include the same material as the first conductive layer 210. The second contact area 255 can be formed from the second conductive layer 220. The second contact area 255 can include an electrically conductive material bonded, joined, attached, soldered, welded, connected, or otherwise be electrically coupled to both the second conductive layer 220 and the second bonding element 170. The second contact area 255 can be positioned away from a center of the second conductive layer 220.

The second contact area 255 defined or included on the second conductive layer 220 can at least partially fracture or open in a failure condition within the housing 105. The failure condition can include a significant increase in heat or a buildup of excessive pressure from within the housing 105 among others (e.g., the container 125 housing the electrolyte in the separators 130, cathodes 135, and anodes 140). The second contact area 255 can include or be defined along one or both surfaces of the second conductive layer 220 as a groove, divot, or indentation into the corresponding surface. The second contact area 255 can correspond to a weakened or a softened portion of the second conductive layer 220. Once at least partially pressured or opened, the second contact area 255 can relieve, alleviate, or lessen effects of the failure condition. For example, the second contact area 255 can reduce the temperature or pressure from within the housing 105.

The second conductive layer 220 can define a second opening 265 to pass the first bonding element 165. For example, both the positive terminal and the negative terminal can be along one side of the housing 105 of the battery cell 100 through the opening 160. The second opening 265 can be hole, aperture, or any other spacing extending from one end of the second conductive layer 220 to the other end of the second conductive layer 220. The second opening 265 can be formed through the second conductive layer 220 to pass the first bonding element 165 from the body region 110 through the neck region 115, the head region 120 of the housing 105, and the opening 160. The second opening 265 can be defined to be located away from a center of the second conductive layer 220. For example, as depicted in FIG. 1, the second opening 265 can be or include a hole extending through the second conductive layer 220 along a vertical axis of the housing 105. The first bonding element 165 passing through the second opening 265 can be connected to one of the cathodes 135. The second opening 265 can include, function, or act as an outlet for the positive terminal for the battery cell 100 defined by the first bonding element 165 connected to the cathode 135. The second bonding element passing through the second opening 265 can be connected to one of the anode 140. The second opening 265 can include, function, or act as an outlet for the positive terminal for the battery cell 100 defined by the first bonding element 165 connected to the anode 140. At least part of the second opening 265 can include an electrically insulative material to electrically separate the first bonding element 165 from the second conductive layer 220. The second opening 265 can include a portion of the second insulation layer 225 extending from the top plane of the second insulation layer 225 past the bottom plane of the second conductive layer 220. The second opening 265 can include a portion of the first insulation layer 215 extending the bottom plane of the first insulation layer 215 past the top plane of the second conductive layer 220.

The second conductive layer 220 can define at least one second notch 260. Each second notch 260 can at least partially fracture or open in a failure condition within the housing 105. The failure condition can include a significant increase in heat or a buildup of excessive pressure from within the housing 105 among others (e.g., the container 125 housing the electrolyte in the separators 130, cathodes 135, and anodes 140). Each second notch 260 can include a groove, divot, or indentation along at least one surface of the second conductive layer 220. Each second notch 260 can be defined along a top surface of the second conductive layer 220 (e.g., as depicted in FIG. 1, among others). Each second notch 260 can be defined along a bottom surface of the second conductive layer 220. A subset of the second notches 260 can be along the top surface of the second conductive layer 220. Another subset of the second notches 260 can be along the bottom surface of the second conductive layer 220. At least some part of the second notches 260 along the top surface of the second conductive layer 220 can include a portion of the first insulation layer 215 extending from the bottom plane of the first insulation layer 215 past the top plane of the second conductive layer 220. At least some part of the second notches 260 along the bottom surface of the second conductive layer 220 can include a portion of the second insulation layer 225 extending from the top plane of the second insulation layer 225 past the bottom plane of the second conductive layer 220. Each second notch 260 defined by the second conductive layer 220 can extend across a longitudinal axis across one of the surfaces of the second conductive layer 220. Each second notch 260 defined by the second conductive layer 220 can extend across a latitudinal axis across one of the surfaces of the second conductive layer 220. The shape of each second notch 260 can be prismatic with a triangular, rectangular, pentagonal, semi-elliptical, and semi-circular, among other shapes for the base.

In relation to the first contact area 240 and the first opening 250 of the first conductive layer 210, the second contact area 255 of the second conductive layer 220 can be located in an offset position. The offset position can allow the second bonding element 170 connected to the second contact area 255 to pass through the first opening 250. The first contact area 240 of the first conductive layer 210 and the second contact area 255 of the second conductive layer 220 can be at least partially out of phase about a vertical axis of the housing 105. The phase for the positioning of the first contact area 240 and the second contact area 255 can range from 0 to 360 degrees. The first contact area 240 and the second contact area 255 can be fully out of phase (e.g., 180 degrees as shown in the example of FIG. 2). The first contact area 240 of the first conductive layer 210 and the second opening 265 defined by the second conductive layer 220 can be fully or substantially partially in phase about a vertical axis of the housing 105 (e.g., up to 20 degrees out of phase). The second contact area 255 of the second conductive layer 220 can be located along the same axis the first opening 250 defined by the first conductive layer 210. For example, the second contact area 255 can be located under the first opening 250 as depicted in the example of FIG. 2.

Relative to the first contact area 240 and first opening 250 of the first conductive layer 210, the second opening 265 of the second conductive layer 220 can be located in an offset position. The offset position can be to allow the first bonding element 165 connected to the first contact area 240 to pass through the second opening 265. The first opening 250 defined by the first conductive layer 210 and the second opening 265 defined by the second conductive layer 220 can be at least partially out of phase about a vertical axis of the housing 105. The phase for the positioning of the first opening 250 and the second opening 265 can range from 0 to 360 degrees. The first opening 250 and the second opening 265 can be fully out of phase (e.g., 180 degrees as shown in FIG. 2). The second contact area 255 of the second conductive layer 220 and the first opening 250 defined by the first conductive layer 210 can be fully or substantially partially in phase about a vertical axis of the housing 105 (e.g., up to 20 degrees out of phase). The first contact area 240 of the first conductive layer 210 can be located along the same axis the second opening 265 defined by the second conductive layer 220. For example, the first contact area 240 can be located over the second opening 265 as depicted in the example of FIG. 2.

The second insulation layer 225 can be disposed in at least part of a space defined at least in part by the sealing element 205, the second conductive layer 220, and one end of the neck region 115. The second insulation layer 225 can include spacing to pass or fit the first bonding element 165 and the second bonding element 170. The second insulation layer 225 can partially or fully span the volume defined by the sealing element 205, the second conductive layer 220, and one end of the neck region 115. The second insulation layer 225 can partially or fully space the volume defined by a bottom plane of the sealing element 205, the inner surface of the sealing element 205, and a bottom plane of the second conductive layer 220. A top plane of the second insulation layer 225 can be in contact or be flush with a bottom plane of the second conductive layer 220. A bottom plane of the second insulation layer 225 can be along the same plane as a top plane of the neck region 115 or the bottom plane of the sealing element 205. A longitudinal plane of the second insulation layer 225 can be in contact with or flush with the inner surface of sealing element 205. The second insulation layer 225 can include any electrically insulative material or dielectric material, such as air, nitrogen, sulfur hexafluoride ($SF_6$), ceramic, glass, and plastic (e.g., polysiloxane), among others. A shape of the second insulation layer 225 can correspond or match the shape of the base of the housing 105, first conductive layer 210, the second conductive layer 220, or the first insulation layer 215. The shape of the second insulation layer 225 be triangular, rectangular, pentagonal, elliptical, and circular, or other shapes. A length of the second insulation layer 225 can be 5-30 mm. The length of the second insulation layer 225 can be greater than the length of the first conductive layer 210 or the second conductive layer 220. A width (or a diameter for circular examples) of the second insulation layer 225 can be 5-30 mm. The width (or the diameter) of the second insulation layer 225 can be greater than the width (or the diameter) of the first conductive layer 210 or the second conductive layer 220. A height or thickness of the second insulation layer 225 can be 0.1-7 mm. The dimensions and shape of the second insulation layer 225 can be the same as dimensions and shape of the first insulation layer 215. The dimensions and shape of the second insulation layer 225 can differ from the dimensions and the shape of the first insulation layer 215 (e.g., to account for adhesion or coating thickness).

Figure 3:
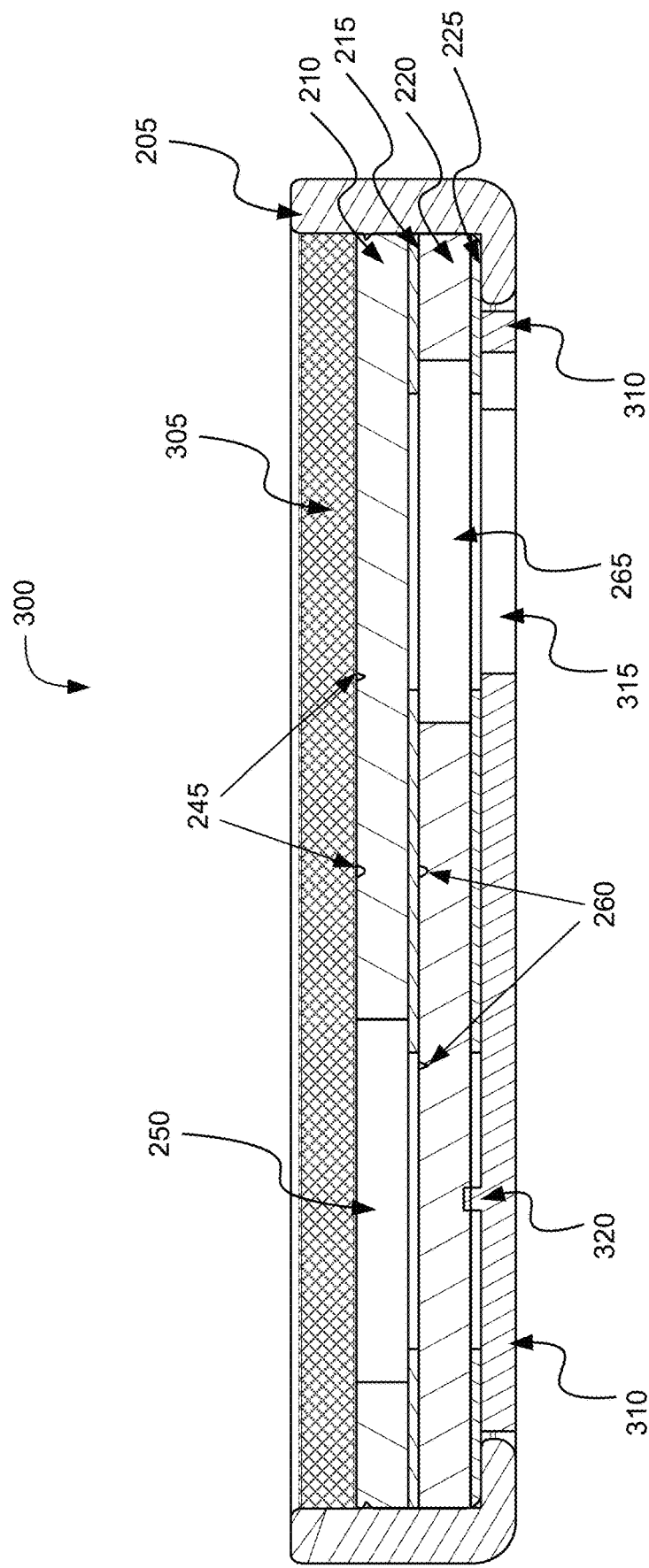
FIG. 3 is a block diagram depicting a cross-sectional view of an example of a sealing element disposed within a head region of a battery cell.

Referring to FIG. 3, depicted is a cross-sectional view 300 of an example of the sealing element 205 disposed within the head region 120 of the battery cell 100. The sealing element 205 can include the first conductive layer 210, the first insulation layer 215, the second conductive layer 220, and the second insulation layer 225. As depicted in FIG. 3, the first conductive layer 210 can define the first opening 250 and one or more first notches 245. The second conductive layer 220 can define the second opening 265 and multiple second notches 260. The first insulator layer 215 can span a volume of space defined by the bottom plane of the first conductive layer 210, the top plane of the second conductive layer 220, and the inner surface of the sealing element 205. The second insulator layer 225 can span a volume of space defined by the bottom plane of the second conductive layer 220, and a bottom edge of the sealing element 205.

The sealing element 205 can house, retain, hold, or otherwise include a covering 305. The covering 305 can retain or maintain the first conductive layer 210, the first insulator layer 215, the second conductive layer 220, and the second insulator layer 225 within the sealing element 205. The covering 305 can be disposed in at least part of a space defined at least in part by the sealing element 205, the first conductive layer 210, and the opening 160. The covering 305 can be disposed in a volume of space defined by the inner surface of the sealing element 205, a top plane of the sealing element 205, and a top plane of the first conductive layer 210. The covering 305 can partially or fully span the volume of space defined by the inner surface of the sealing element 205, a top plane of the sealing element 205, and a top plane of the first conductive layer 210. A bottom plane of the covering 305 can be in contact with or be flush with the top plane of the first conductive layer 210. The bottom plane of the covering 305 can be parallel to the top plane of the first conductive layer 210. The covering 305 can include an electrically insulative material, such as a ceramic material or plastic among others. The covering 305 can include one or more openings to pass the first bonding element 165 and the second bonding element 170 from the head region 120 to outside the sealing element 205 and the battery cell 100. The covering 305 can be fitted onto the opening 160 of the head region 120. A shape of the covering 305 can correspond or match the shape of the base of the housing 105, first conductive layer 210, the second conductive layer 220, the first insulation layer 215, or the second insulation layer 225. The shape of the covering 305 be triangular, rectangular, pentagonal, elliptical, and circular, or other shapes. A length of the covering 305 can be 17-30 mm. A width (or a diameter for circular examples) of the covering 305 can be 17-30 mm. A height or thickness of the covering 305 can be 5-10 mm.

In addition, the sealing element 205 can house, retain, hold, or otherwise include a protector 310. The protector 310 can electrically decouple the first bonding element 165 from the first conductive layer 210 and the second bonding element 170 from the second conductive layer 220 in response to a failure event. The failure event can be related to current, voltage, temperature, or pressure originating from within the body region 110 of the housing 105 for the battery cell 100. For example, the failure event can include an excessively high current or over-voltage event (e.g., above 4.2 volts originating from the cathodes 135 and anodes 140), resulting in lithium plating in the anodes 140 of a lithium-ion battery cell. The failure event can also include an excessively low current or under-voltage event (e.g., below 2 volts discharged from the cathodes 135 and anodes 140), leading to chemical breakdown of the cathodes 135 and anodes 140. The failure event can include a dramatic increase in temperature and pressure within the body region 110 from a thermal runaway (e.g., a temperature of more than 110° C. or a pressure of more than 1,000 kPa). The protector 310 can include a current interrupt device (CID), an electrical fuse, a thermal fuse, or a printed circuit board (PCB) protection board, among others. The protector 310 can be disposed in the sealing element 205. The protector 310 can be disposed or positioned toward the bottom plane of the sealing element 205. The protector 310 can be disposed in a space defined by the second insulator layer 225 and the sealing element 205. The protector 310 can be disposed in a volume of space defined by the bottom plane of the second insulator layer 225, an inner surface of the sealing element 205, and a bottom plane of the sealing element 205. A shape of the protector 310 can correspond or match the shape of the base of the housing 105, first conductive layer 210, the second conductive layer 220, the first insulation layer 215, or the second insulation layer 225. The shape of the protector 310 be triangular, rectangular, pentagonal, elliptical, and circular, or other shapes. A length of the protector 310 can be 17-30 mm. A width (or a diameter in circular examples) of the protector 310 can be 10-30 mm. A height or thickness of the protector 310 can be 3-5 mm.

The protector 310 can also define an opening 315 to pass the first bonding element 165 or the second bonding element 170 from the neck region 115 to the remainder of the sealing element 205. The opening 315 can include a hole, aperture, or any other spacing extending from one end of the protector 310 to another end of the protector 310. The opening 315 can be located away from a center of the protector 310. For example, as depicted in FIG. 1, among others, the opening 315 can be a hole extending through the protector 310 along a vertical axis of the housing 105. The opening 315 can allow one of the first bonding element 165 or the second bonding element 170 from the neck region 115.

The protector 310 can also include a connector 320 (e.g., an ultrasonic or spot weld) to electrically couple the protector 310 to the second conductive layer 220. The protector 310 can be bonded, joined, attached, soldered, welded, connected, or otherwise electrically coupled to one of the bonding elements 165 and 170. The protector 310 can be, for example, connected to the second bonding element 170. The connector 320 can pass through the second insulator layer 225 to couple with the second conductive layer 220. The connector 320 can include electrically conductive material, such as aluminum, an aluminum alloy with copper, silicon, tin, magnesium, manganese or zinc (e.g., of the aluminum 4000 or 5000 series), iron, an iron-carbon alloy (e.g., steel), silver, nickel, copper, and a copper alloy, among others. The connector 320 can be configured to decouple the second bonding element 170 from the second conductive layer 220 in the failure event (e.g., excessive current from the anode 140 via the second bonding element 170).

Figure 4:
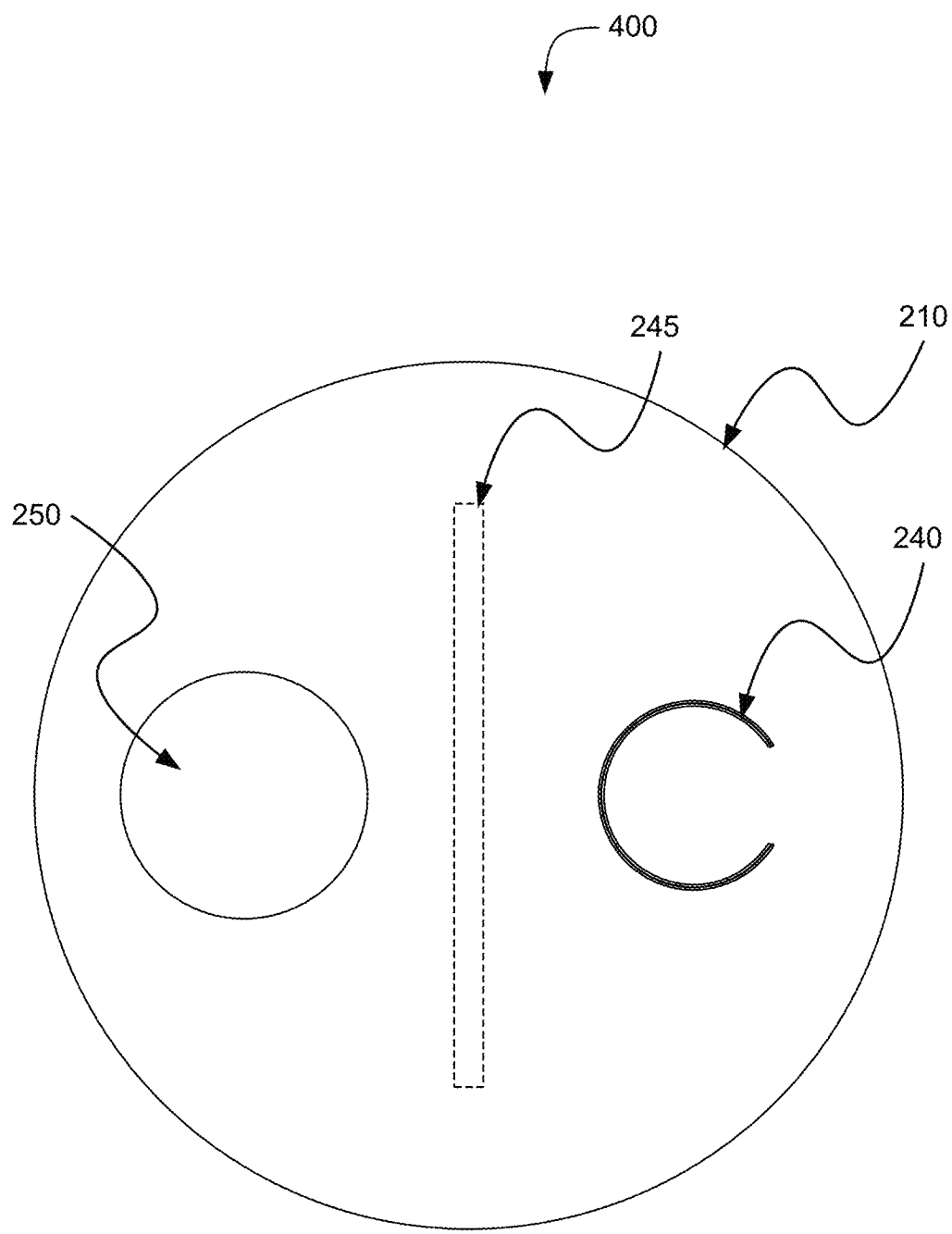
FIG. 4 is a block diagram depicting a top-down view of an example of double conductive layers disposed within a sealing element of a head region of a battery cell.

Referring to FIG. 4, depicted is a top-down view 400 of an example of the first conductive layer 210 disposed within the sealing element 205 of the head region 120 of the battery cell 100. The first conductive layer 210 can include or define a semicircular groove for the first contact area 240 for a first polarity terminal of the battery cell 100. The semicircular groove for the first contact area 240 can partially fracture or flap open in the event of a failure event within the body region 110 of the housing 105 to alleviate pressure or temperature. The first bonding element 165 can be connected or electrically coupled to the first conductive layer 210 fitted through the semicircular groove forming the first contact area 240. The first conductive layer 210 can include or define a straight divot extending along one surface as the first notch 245. The straight divot forming the first notch 245 can be configured to fracture or burst open in the event of failure vent within the body region 110 of the housing 105 to relieve pressure or temperature. The first conductive layer 210 can define a circular hole as the first opening 250. The circular hole forming the first opening 250 can pass the second bonding element 170.

The second conductive layer 220 can be the similar as the first conductive layer 210 as depicted in the top-down view 400 of FIG. 4. The second conductive layer 220 can include or define a semicircular groove for the second contact area 255 for a second polarity terminal of the battery cell 100. The semicircular groove for the second contact area 255 can partially fracture or flap open in the event of a failure event within the body region 110 of the housing 105 to alleviate pressure or temperature. The second bonding element 170 can be connected or electrically coupled to the second conductive layer 220 fitted through the semicircular groove forming the second contact area 255. The second conductive layer 220 can define a straight divot extending along one surface as the second notch 260. The straight divot forming the second notch 260 can fracture or burst open in the event of failure vent within the body region 110 of the housing 105 to relieve pressure or temperature. The second conductive layer 220 can define a circular hole as the second opening 265. The circular hole forming the second opening 265 can pass the first bonding element 165.

Figure 5:
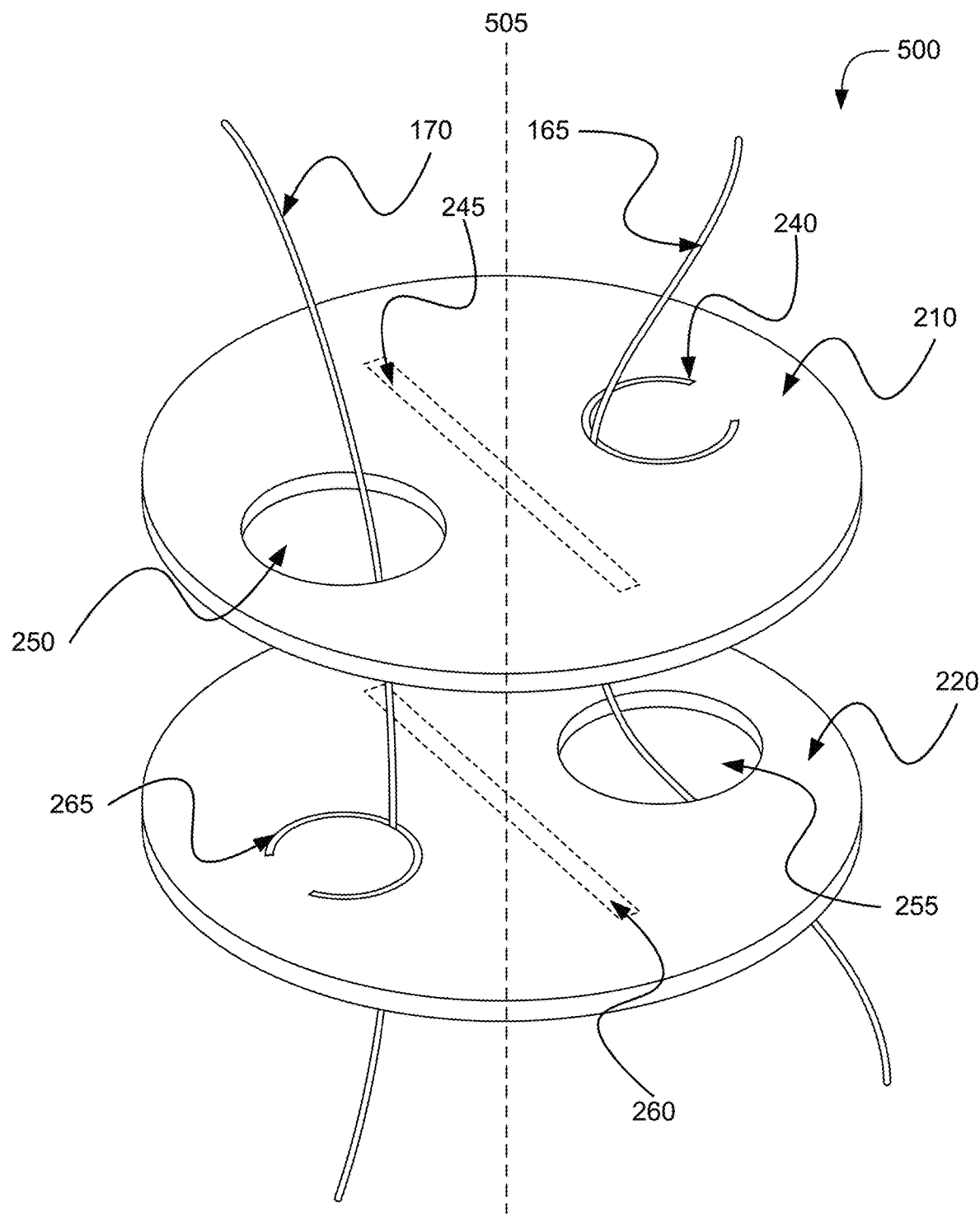
FIG. 5 is a block diagram depicting an exploded view of an example of the double conductive layers disposed within a sealing element of a head region of a battery cell.

Referring to FIG. 5, depicted is an exploded view 500 of an example of the first conductive layer 210 and the second conductive layer 220 disposed within the sealing element 205 of the head region 120 of the battery cell 100 for a battery pack in an electric vehicle. As depicted in FIG. 5, the first contact area 240 of the first conductive layer 210 can be fully out of phase (e.g., 180 degrees) with the second contact area 255 of the second conductive layer 220 about a vertical axis 505 of the housing 105. The first contact area 240 can be located over the second opening 265 defined by the second conductive layer 220. In addition, the first opening 250 defined by the first conductive layer 210 can be fully out of phase (e.g., 180 degrees) second opening 265 defined by the second conductive layer 220. The first opening 250 defined by the first conductive layer 210 can be positioned over the second contact area 255 of the second conductive layer 220. In this manner, the first bonding element 165 can pass through the second opening area 265 defined by the second conductive layer 220 and be electrically coupled to the first conductive layer 210 via the first contact area 240 to form one of the polarity terminals. Additionally, the second bonding element 170 can be electrically coupled to the second conductive layer 220 via the second contact area 255 to form the other polarity terminal and to pass through the first opening 250 defined by the first conductive layer 210.

Figure 6:
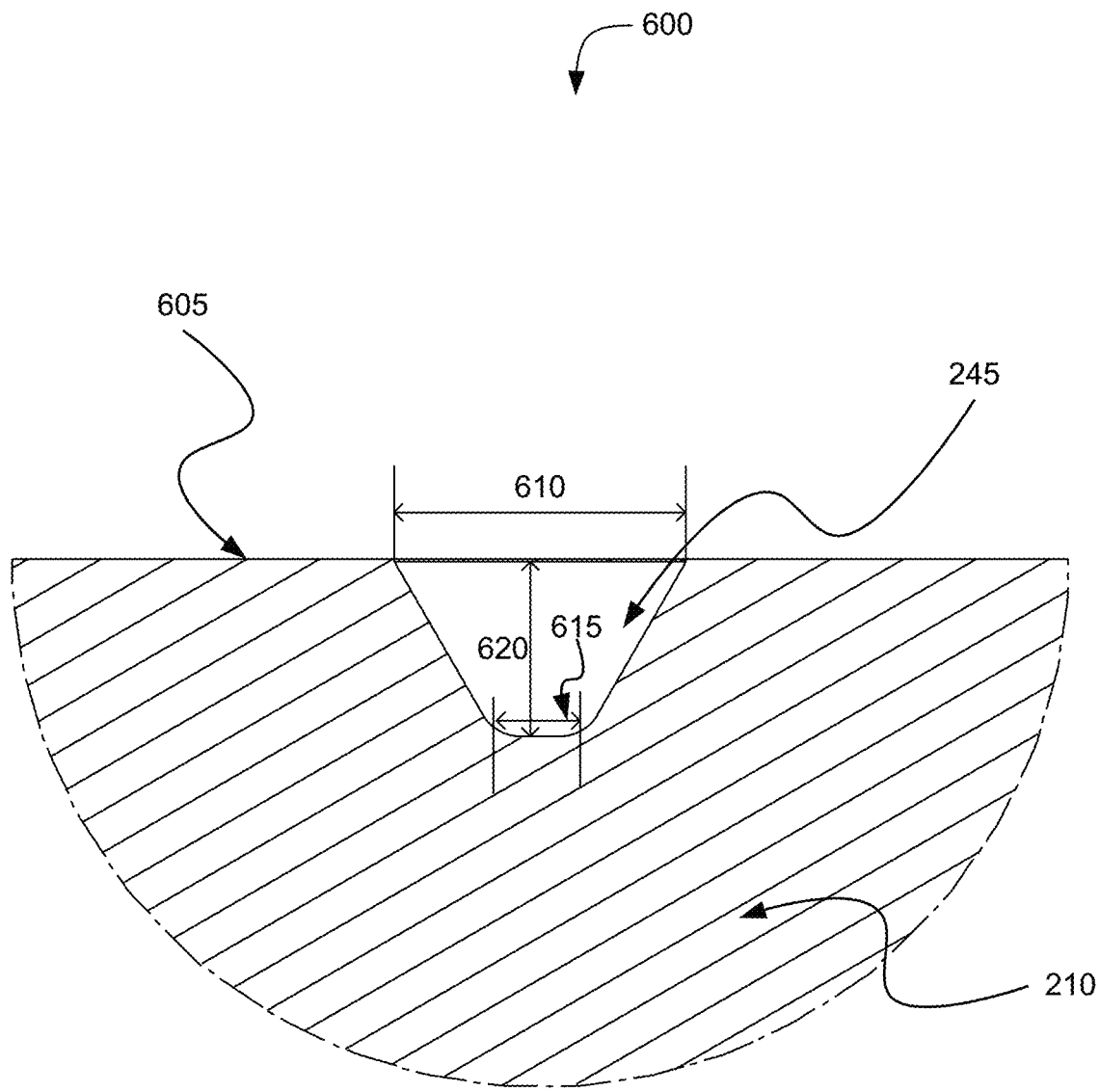
FIG. 6 is a block diagram depicting a cross-sectional view of an example of a notch defined by a surface of a conductive layer.

Referring to FIG. 6, depicted is a cross-sectional view 600 of an example of the first notch 245 defined by a surface 605 of the first conductive layer 210 for a battery pack in an electric vehicle. The surface 605 can correspond to a top surface or a bottom surface of the first conductive layer 210. The surface 605 can define the first notch 245. In the example depicted in FIG. 6, the first notch 245 can be in the shape of a trapezoidal divot although cross-sectional shapes such as rectangular, square, or curved are possible, as well as irregular shapes. A width 610 of a first base along the surface 605 defining the first notch 245 can be 1-7 mm. A width 615 of a second base of the first notch 245 within the surface 605 forming the first notch 245 can be 1-4 mm. A height 620 or depth of the first notch 245 within the surface 605 forming the first notch 245 can be 0.2-4.8 mm.

Figure 7:
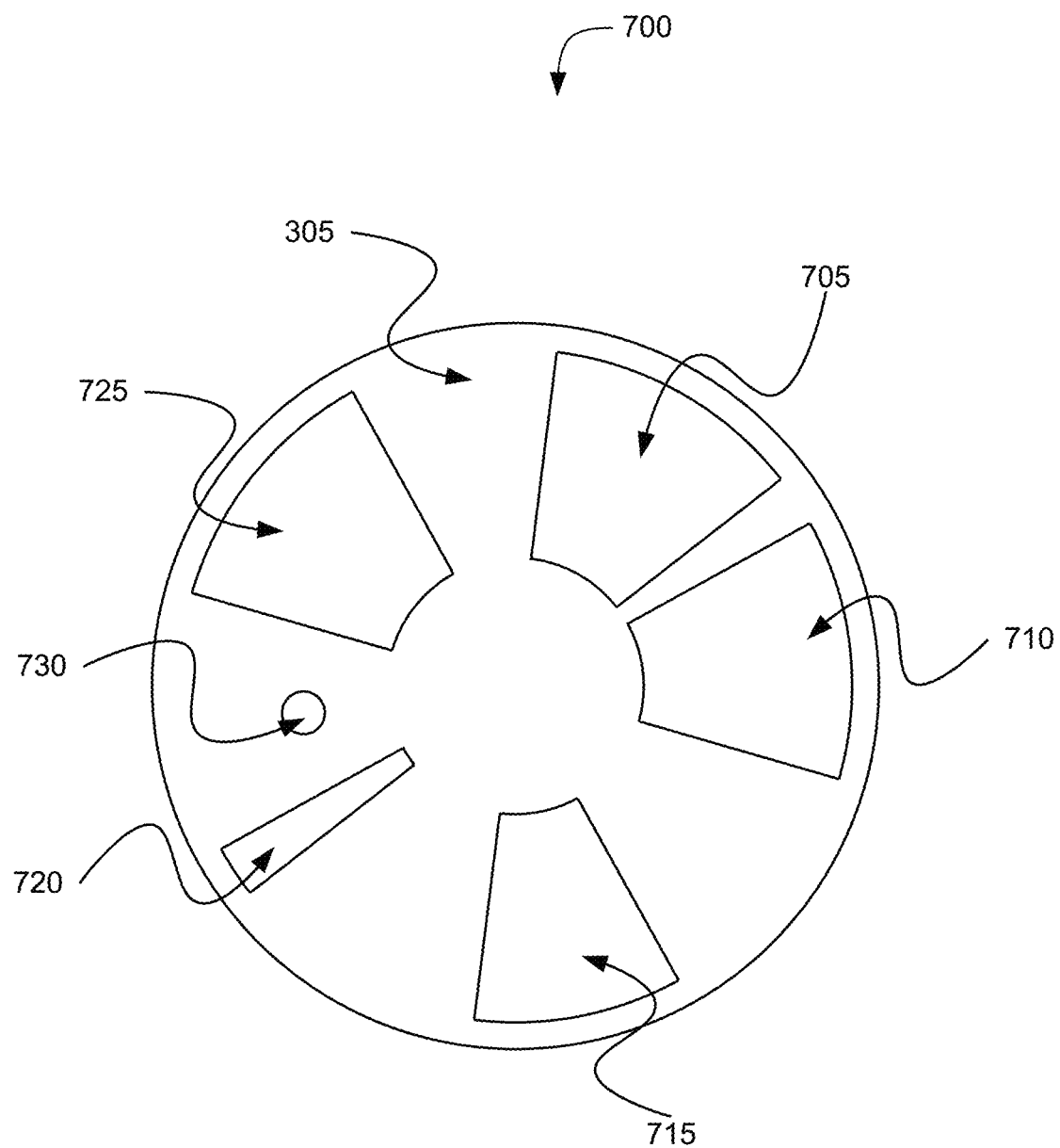
FIG. 7 is a block diagram depicting a top-down view of an example of a covering for a head region of a battery cell for a battery pack in an electric vehicle.

Referring to FIG. 7, depicted is a top-down view 700 of an example of the covering 305 for the head region 120 of the battery cell 100 for a battery pack in an electric vehicle. The cover 305 can define one or more openings 705, 710, 715, 720, 725, and 730. The one or more openings 705-730 can pass the first bonding element 165 and the second bonding element 170 from the head region 120 and out of the housing 105. The one or more openings 705-730 can alleviate, relieve, or reduce effects of a failure event (e.g., excessive pressure or temperature) from within the housing 105. Each opening 705-730 can be located away from a center of the covering 305 about a vertical axis of the housing 105. The openings 705-730 can be of various shapes, such as a triangular, rectangular, pentagonal, elliptical, and circular, among others. In the example depicted in FIG. 7, the openings 705-725 may be trapezoidal and the opening 730 may be circular.

Figure 8:
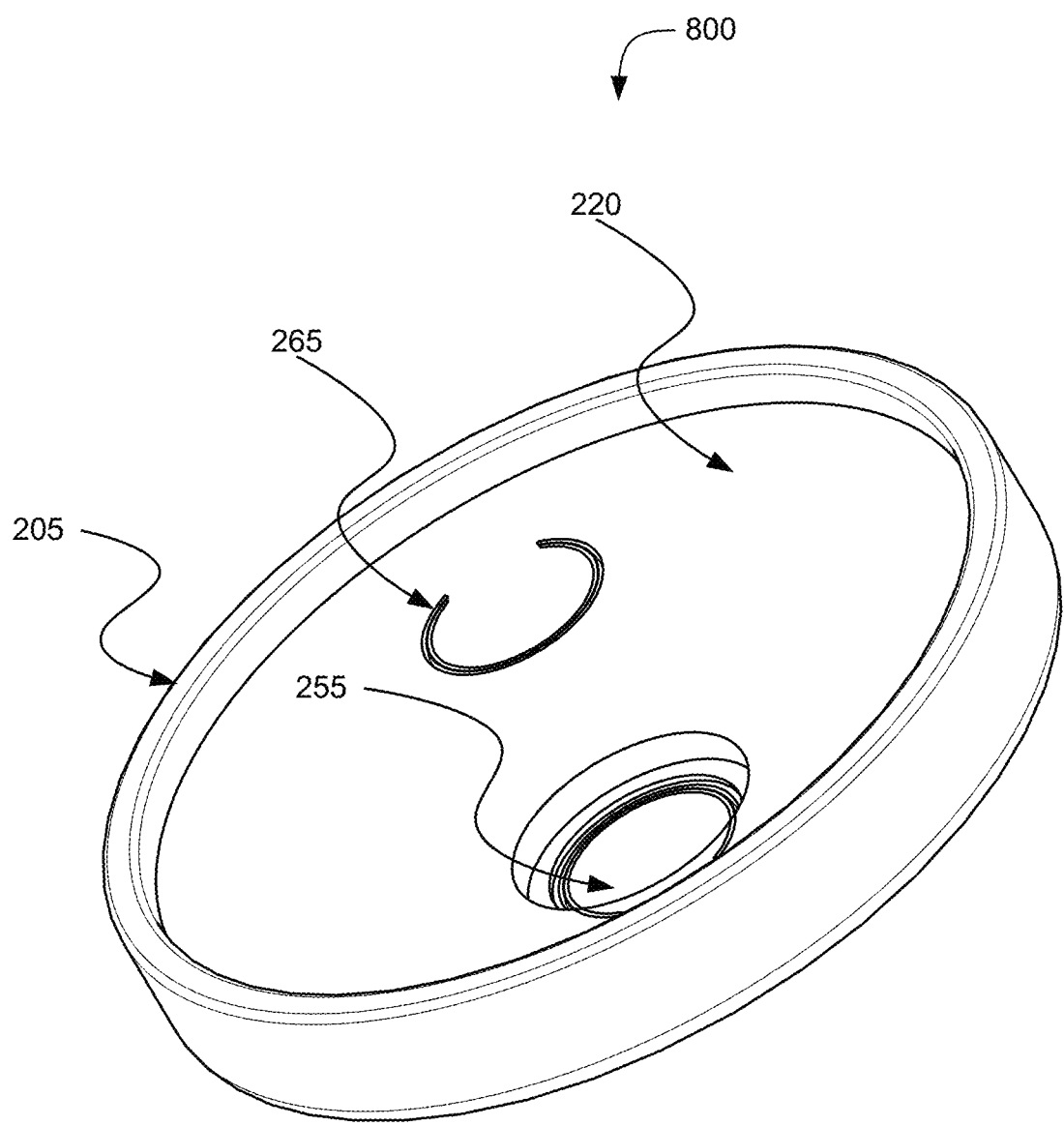
FIG. 8 is a block diagram depicting an isometric view of an example of a lid for a head region of a battery cell for a battery pack in an electric vehicle.
Figure 9:
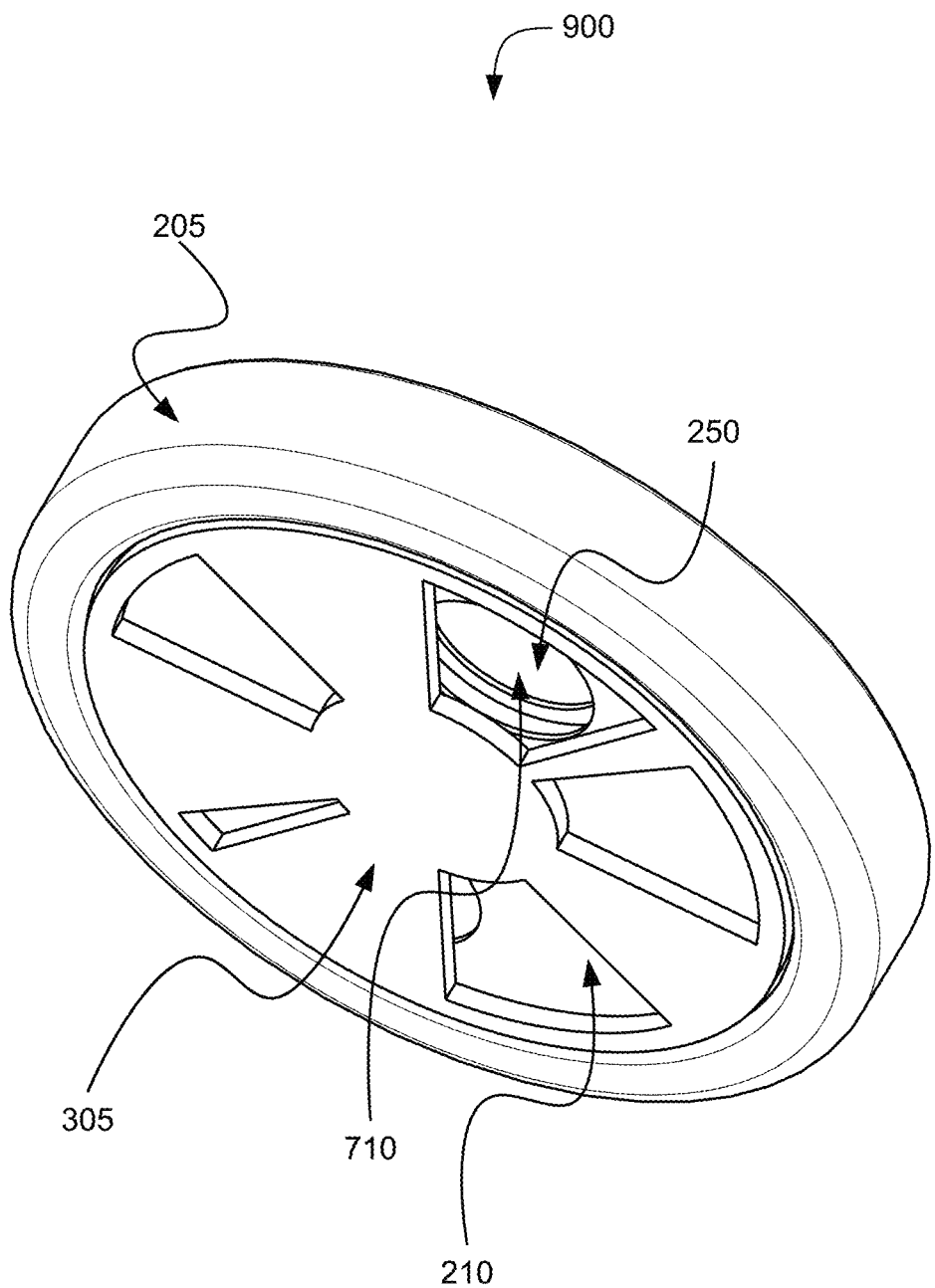
FIG. 9 is a block diagram depicting an isometric view of an example of lid for a head region of a battery cell for a battery pack in an electric vehicle.

Referring to FIG. 8, depicted is an isometric view 800 of an example of sealing element 205 for the head region 120 of the battery cell 100 for a battery pack in an electric vehicle. The isometric view 800 may be from the bottom plane of the sealing element 205. As depicted in FIG. 8, from the bottom plane of the sealing element 205, the second contact area 255 of the second conductive layer 220 and the second opening 265 defined by the second conductive layer 220 can be exposed. Referring to FIG. 9, depicted is an isometric view 900 of an example of the sealing element 205 for the head region 120 of the battery cell 100 for a battery pack in an electric vehicle. The isometric view 900 may be from the top plane of the sealing element 205 with the covering 305. As depicted in FIG. 9, from the top of the sealing element 205, the covering 305 can partially cover the first conductive layer 210. The one or more openings 705-730 can expose various portions of the top surface of the first conductive layer 210. For example, the opening 710 can expose the first opening 250 defined by the first conductive layer 210 and a portion of the top surface of the first conductive layer 210.

Figure 10:
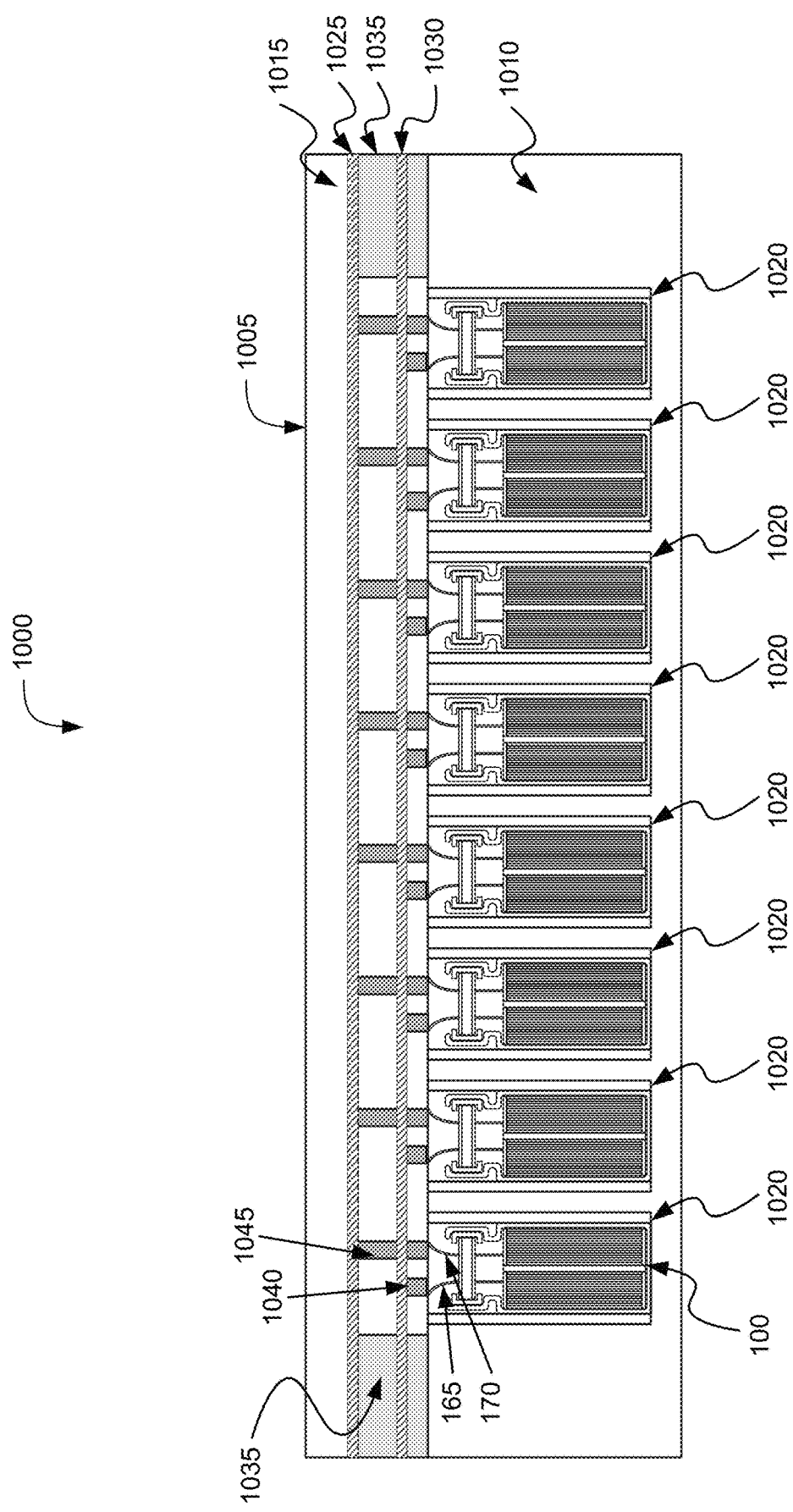
FIG. 10 is a block diagram depicting a cross-sectional view of an example battery pack for holding battery cells in an electric vehicle.

Referring to FIG. 10, depicted is a cross-section view 1000 of a battery pack 1005 to hold a plurality of battery cells 100 in an electric vehicle. The battery pack 1005 can include a battery case 1010 and a capping element 1015. The battery case 1010 can be separated from the capping element 1015. The battery case 1010 can include or define a plurality of holders 1020. Each holder 1020 can be or include a hollowing or a hollow portion defined by the battery case 1010. Each holder 1020 can house, contain, store, or hold a battery cell 100. The battery case 1010 can include at least one electrically or thermally conductive material, or combinations thereof. The battery case 1010 can include one or more thermoelectric heat pumps. Each thermoelectric heat pump can be thermally coupled directly or indirectly to a battery cell 100 housed in the holder 1020. Each thermoelectric heat pump can regulate temperature or heat radiating from the battery cell 100 housed in the holder 1020. The first bonding element 165 and the second bonding element 170 can extend from the battery cell 100 through the respective holder 1020 of the battery case 1010.

Between the battery case 1010 and the capping element 1015, the battery pack 1005 can include a first current collector 1025, a second current collector 1030, and an electrically insulative layer 1035. The first current collector 1025 and the second current collector 1030 can each include an electrically conductive material to provide electrical power to other electrical components in the electric vehicle. The first current collector 1025 (sometimes referred to as a first busbar) can be connected or otherwise electrically coupled to the first bonding element 165 extending from each battery cell 100 housed in the plurality of holders 1020 via a bonding element 1045. The bonding element 1045 can be bonded, welded, connected, attached, or otherwise electrically coupled to the second bonding element 165 extending from the battery cell 100. As discussed above, the first bonding element 165 can define the first polarity terminal for the battery cell 100. The first current collector 1025 can define the first polarity terminal for the battery pack 1005. The second current collector 1030 (sometimes referred to as a second busbar) can be connected or otherwise electrically coupled to the second bonding element 170 extending from each battery cell 100 housed in the plurality of holders 1020 via a bonding element 1040. The bonding element 1040 can be bonded, welded, connected, attached, or otherwise electrically coupled to the second bonding element 170 extending from the battery cell 100. As discussed above, the second bonding element 170 can define the second polarity terminal for the battery cell 100. The second current collector 1030 can define the second polarity terminal for the battery pack 1005.

The first current collector 1025 and the second current collector 1030 can be separated from each other by the electrically insulative layer 1035. The electrically insulative layer 1035 can include spacing to pass or fit the first bonding element 165 connected to the first current collector 1025 and the second bonding element 170 connected to the second current collector 1030. The electrically insulative layer 1035can partially or fully span the volume defined by the battery case 1010 and the capping element 1015. A top plane of the electrically insulative layer 1035 can be in contact or be flush with a bottom plane of the capping element 1015. A bottom plane of the electrically insulative layer 1035 can be in contact or be flush with a top plane of the battery case 1010. The electrically insulative layer 1035 can include any electrically insulative material or dielectric material, such as air, nitrogen, sulfur hexafluoride ($SF_6$), ceramic, glass, and plastic (e.g., polysiloxane), among others to separate the first current collector 1025 from the second current collector 1030.

Figure 11:
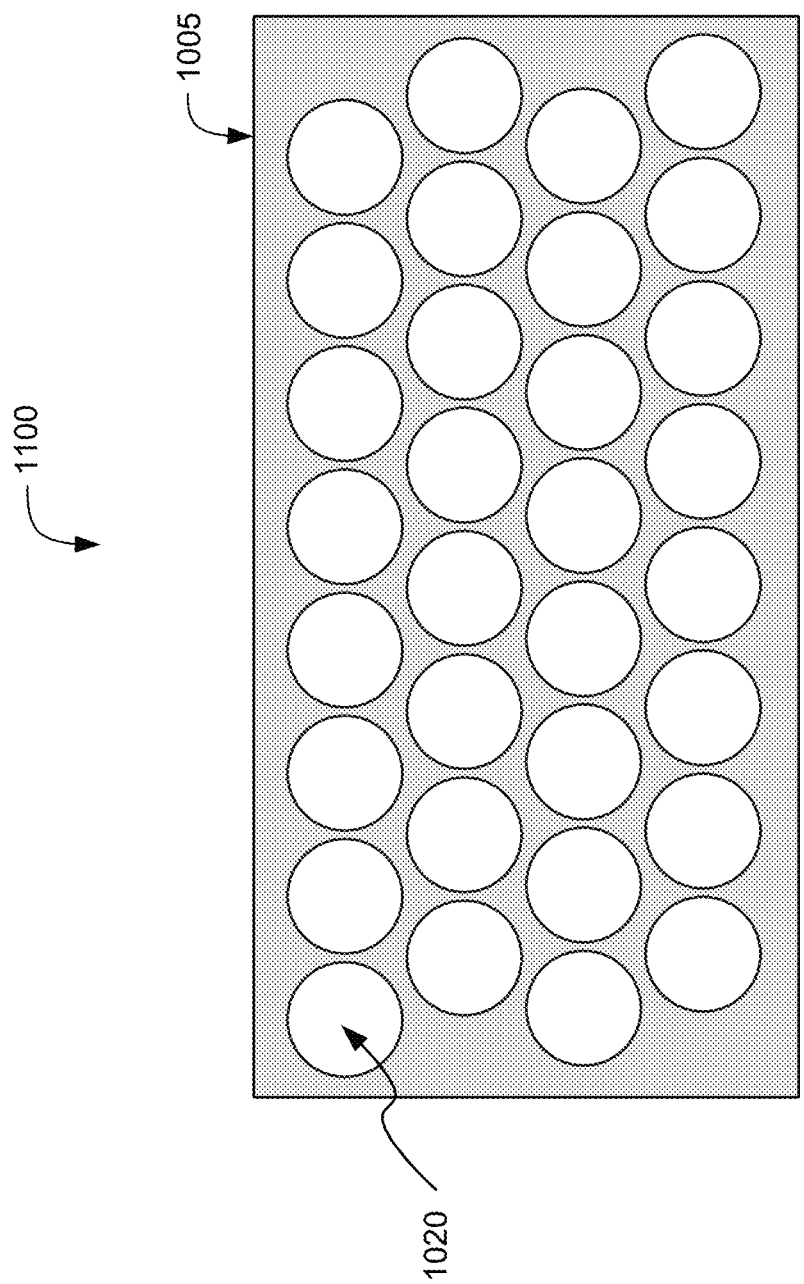
FIG. 11 is a block diagram depicting a top-down view of an example battery pack for holding for battery cells in an electric vehicle.

Referring to FIG. 11, depicted is a top-down view 1100 of a battery pack 1005 to a hold a plurality of battery cells 100 in an electric vehicle. The battery pack 1005 can define or include a plurality of holders 1020. The shape of each holder 1020 can be triangular, rectangular, pentagonal, elliptical, and circular, among others. The shapes of each holder 1020 can vary or can be uniform throughout the battery pack 1005. For example, some holders 1020 can be hexagonal in shape, whereas other holders can be circular in shape. The shape of the holder 1020 can match the shape of the housing 105 of each battery cell 100 housed therein. The dimensions of each holder 1020 can be larger than the dimensions of the battery cell 100 housed therein.

Figure 12:
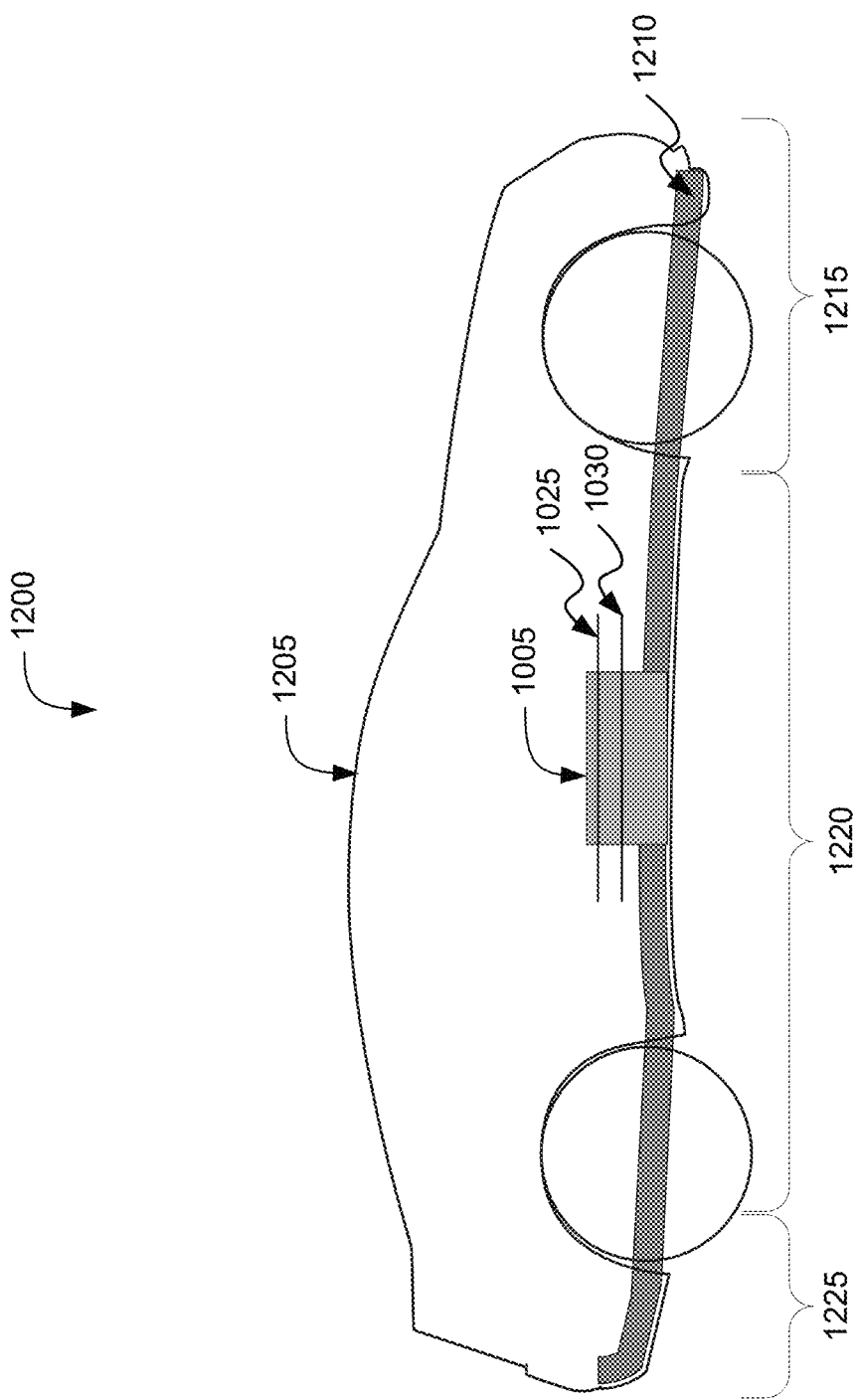
FIG. 12 is a block diagram depicting a cross-sectional view of an example electric vehicle installed with a battery pack.

Referring to FIG. 12, depicted is a cross-section view 1200 of an electric vehicle 1205 installed with a battery pack 1005. The electric vehicle 1205 can include a chassis 1210 (sometimes referred to as a frame, internal frame, or support structure). The chassis 1210 can support various components of the electric vehicle 1205. The chassis 1210 can span a front portion 1215 (sometimes referred to a hood or bonnet portion), a body portion 1220, and a rear portion 1225 (sometimes referred to as a trunk portion) of the electric vehicle 1205. The battery pack 1005 can be installed or placed within the electric vehicle 1205. The battery pack 1005 can be installed on the chassis 1210 of the electric vehicle 1205 within the front portion 1215, the body portion 1220 (as depicted in FIG. 12), or the rear portion 1225. The first current collector 1025 and the second current collector 1030 can be connected or otherwise be electrically coupled to other electrical components of the electric vehicle 1205 to provide electrical power.

Figure 13:
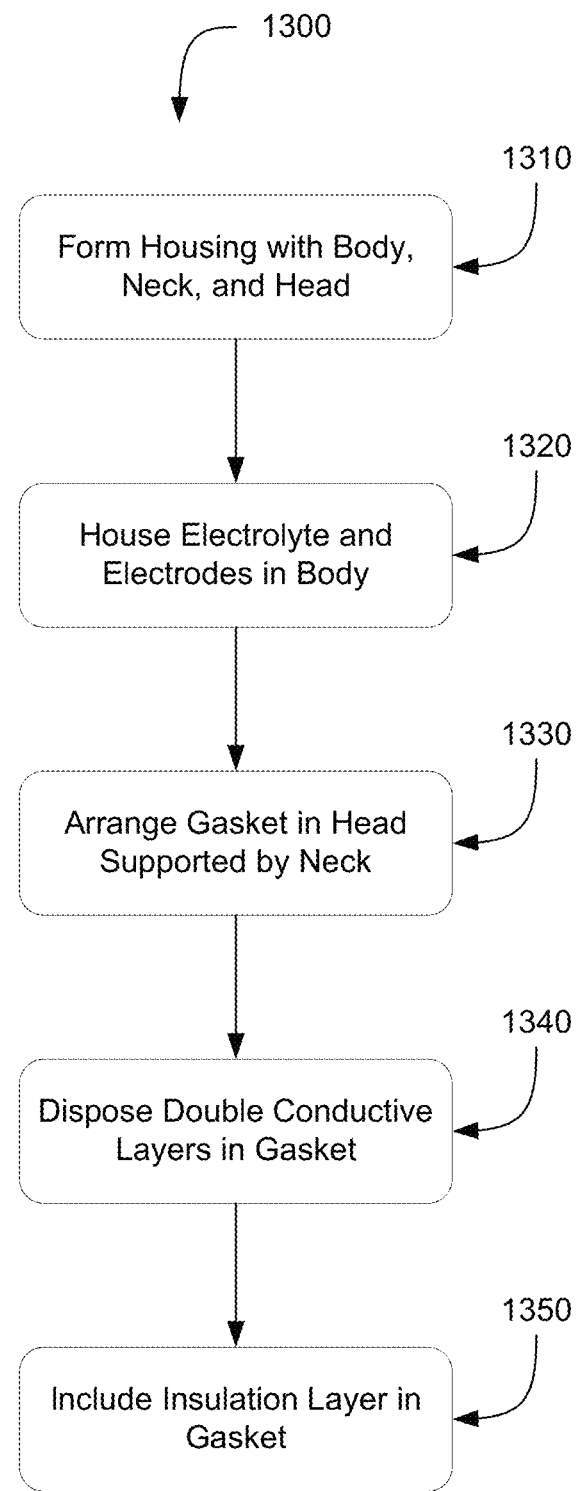
FIG. 13 is a flow diagram depicting an example method of providing battery cells for battery packs for electric vehicles.

Referring to FIG. 13, depicted is a method 1300 of providing battery cells for battery packs in electric vehicles. The functionalities of the method 1300 can be implemented or performed using any of the systems, apparatuses, or battery cells detailed above in conjunction with FIGS. 1-13. The method 1300 can include forming a housing for a battery cell including a body, a neck, and a head (ACT 1310). The method 1300 can include housing an electrolyte and electrodes in the body (ACT 1320). The method 1300 can include arranging a sealing element in the head supported by the neck (ACT 1330). The method 1300 can include disposing double conductive layer in the sealing element (ACT 1340). The method 1300 can include including an insulation layer in the sealing element (ACT 1350).

The method 1300 can include forming a housing 105 for a battery cell 100 including a body region 110, a neck region 115, and a head region 120 (ACT 1310). The battery cell 100 can be a lithium ion battery cell, a nickel-cadmium battery cell, or a nickel-metal hydride battery cell. The battery cell 100 can be part of a battery pack 1005 installed within a chassis 1210 of an electric vehicle 1205. The housing 105 can be formed from a cylindrical casing with a circular, ovular, or elliptical base or from a prismatic casing with a polygonal base. The neck region 115 can be defined by an indentation protruding between the body region 110 and the head region 120. The indentation 150 of the neck region 115 can be formed by crimping, squeezing, or applying any pressure on an outer surface of the housing 105 along one axis. The housing 105 can also have an opening 160 spanning a lateral end of the head region 110.

The method 1300 can include housing an electrolyte and electrodes 135 and 140 in the body (ACT 1320). The body region 110 can house or include a cathode (e.g., the electrode 135), an anode (e.g., the electrode 140), and a separator 130 to divide the cathode from the anode. The separator 130 can also include or contain an electrolyte. The cathode, the anode, and the separator 130 can be placed or inserted into the body region 110 of the housing 105 through the opening 160. The cathode 135, the anode 140, and the separator 130 can be placed, arranged, or stacked in a layered manner. The separator 130 with the electrolyte, the cathode 135, and the anode 140 can be placed or inserted into a container 125. The container 125 can be inserted or placed into inserted into the body region 110 of the housing 105. Once the anode, cathode, and the separator 130 are placed or inserted into the body region 110 of the housing 105, the indentation 150 of the neck region 115 can be formed by crimping or applying any pressure along an outer surface of the housing 105. A positive terminal bonding element (e.g., the first bonding element 160) can be connected or electrically coupled to the cathode. The positive terminal bonding element can be attached to the cathode via welding. The positive terminal bonding element can extend from the body through the neck and head of the housing for the battery cell. A negative terminal bonding element (e.g., the second bonding element 165) can be connected or electrically coupled to the anode. The negative terminal bonding element can be attached to the anode to the anode via welding. The negative terminal bonding element can extend from the body through the neck and head of the housing for the battery cell. The housing can include a thermally conductive material.

The method 1300 can include arranging a sealing element 205 in the head region 120 supported by the neck (ACT 1330). The sealing element 205 can be positioned to hermetically seal the electrolyte and the electrodes 135 and 140 of the battery cell 100 within the body region 110. The sealing element 205 can include an electrically insulative material. The sealing element 205 can be supported by a shoulder portion 230 formed by the indentation 150 of the neck region 115. The sealing element 205 can be placed or inserted through the opening 160 of the housing 105. The sealing element 205 can be placed or inserted into the head region 120 of the housing 105 to rest on the shoulder portion 230.

The method 1300 can include disposing double conductive layer in the sealing element 205 (ACT 1340). The sealing element 205 can include a first conductive layer 210 and a second conductive layer 220. The first conductive layer 210 can include a first contact area 240 to electrically couple with the cathode (e.g., the electrode 135) via the positive terminal bonding element 165. The first conductive layer 210 can define a first opening 250 to pass the negative terminal bonding element 170 extending from the anode (e.g., the electrode 140). The second conductive layer 220 can include a second contact area 255 to electrically couple with the anode via the negative terminal bonding element 170. The second conductive layer 220 can include a second contact area 255 to electrically couple with the anode via the negative terminal bonding terminal 170. The second conductive layer 220 can include a second opening 265 to pass the positive terminal bonding terminal 165 connected to the cathode and the first conductive layer 210. The first conductive layer 210 can be placed or inserted into one end of the sealing element 205. The first conductive layer 210 can be arranged toward a first end of the sealing element 205. The second conductive layer 220 can be placed or inserted into one end of the sealing element 205. The second conductive layer 220 can be arranged toward a second end of the sealing element 205 opposite of the first end. The first conductive layer 210 can be arranged substantially in parallel to the second conductive layer 220 (e.g., within 10 degrees). The insertion of the first conductive layer 210 and the second conductive layer 210 into the sealing element 205 can be done prior to the insertion of the sealing element 205 into the head region 120. A first notch 245 can be formed on the first conductive layer. The first notch 245 can be defined by the first conductive layer 210, and can fracture during a failure event (e.g., excessive heat or pressure buildup in the body of the housing). A second notch 260 can be formed on the second conductive layer 220. The second notch 260 can be defined by the second conductive layer 220, and can be configured to fracture during the failure event.

The method 1300 can include including an insulation layer 215 in the sealing element 205 (ACT 1350). The insulation layer 215 can be disposed in a volume of space formed by the first conductive layer 210, the second conductive layer 220, and the sealing element 205. The insulation layer 215 can electrically isolate the first conductive layer 210 from the second conductive layer 220. The insulation layer 215 can be placed or inserted into the sealing element 205. The insertion of the insulation layer 215 into the sealing element 205 can be prior to insertion of the first conductive layer 210 or the second conductive layer 220 into the sealing element 205. The insulation layer 215 can also pass the positive terminal bonding 165 element and the negative terminal bonding element 170. With the insertion of the first conductive layer 210, the second conductive layer 220, and the insulation layer 215 into the sealing element 205, the sealing element 205 can be placed or inserted into the head region 120 of the housing 105. A lip portion 235 can be formed on one end of the head region 120 along the opening 160 to hold the sealing element 205 in the housing 105.

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

References to "or" can be construed as inclusive so that any terms described using "or" can indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

The systems and methods described herein can be embodied in other specific forms without departing from the characteristics thereof. Scope of the systems and methods described herein is thus indicated by the appended claims, rather than the foregoing description, and changes that come within the meaning and range of equivalency of the claims are embraced therein.

What is claimed is:

1. A battery cell of a battery pack for electric vehicles, the battery cell comprising:
   a housing having a body region, a neck region, and a head region, the body region including an electrolyte, a first electrode, and a second electrode;
   a sealing element disposed in the head region and supported by a shoulder portion of the neck region;
   a first conductive layer disposed within the sealing element, the first conductive layer including a first polarity terminal to electrically couple with a first bonding element connected to the first electrode, the first conductive layer defining a first opening to pass a second bonding element;
   a second conductive layer disposed within the sealing element, the second conductive layer including a second polarity terminal to electrically couple with the second bonding element connected to the second electrode, the second conductive layer defining a second opening to pass the first bonding element, the second opening located in an offset position from the first opening; and
   an insulation layer disposed in at least part of a space defined by the first conductive layer, the second conductive layer, and the sealing element.

2. The battery cell of claim 1, comprising:
   a first surface of the first conductive layer defining a first notch configured to fracture in a failure condition to vent pressure from the body region; and
   a second surface of the second conductive layer having defining a second notch configured to fracture in the failure condition to vent the pressure from the body region.

3. The battery cell of claim 2, comprising:
   the first surface of the first conductive layer defining at least one of a cubical divot, a half-cylindrical divot, and a triangular prismatic divot for the first notch; and
   the second surface of the second conductive layer defining at least one of a cubical divot, a half-cylindrical divot, and a triangular prismatic divot for the second notch.

4. The battery cell of claim 2, comprising:
   the first notch extending across at least one of a longitudinal axis and a latitudinal axis across the first surface of the first conductive layer; and
   the second notch extending across at least one of a longitudinal axis and a latitudinal axis across the second surface of the second conductive layer.

5. The battery cell of claim 1, comprising:
   the first conductive layer having a first contact for the first polarity terminal, the first contact to electrically couple the first bonding element with the first conductive layer; and
   the second conductive layer having a second contact for the second polarity terminal, the second contact to electrically couple the second bonding element with the second conductive layer, the second contact located in an offset position from the first contact.

6. The battery cell of claim 1, comprising:
   the first conductive layer defining a first groove for a first contact for the first polarity terminal, the first contact to electrically couple the first bonding element with the first conductive layer, the first groove configured to partially open in a failure condition to vent pressure from the body region; and
   the second conductive layer defining a second groove for a second contact for the second polarity terminal, the second contact to electrically couple the second bonding element with the second conductive layer, the second groove configured to partially open in the failure condition to vent the pressure from the body region.

7. The battery cell of claim 1, comprising:
   the second opening defined by the second conductive layer located in the offset position at least partially out of phase about a vertical axis of the housing from the first opening defined by the first conductive layer; and
   the second polarity terminal of the second conductive layer located in a second offset position at least partially out of phase about the vertical axis of the housing from the first polarity terminal of the first conductive layer.

8. The battery cell of claim 1, comprising:
   the first bonding element configured to electrically couple the first electrode of the body region via the first conductive layer with a first current collector of an electric vehicle; and
   the second bonding element configured to electrically couple the second electrode of the body region via the second conductive layer with a second current collector of the electric vehicle.

9. The battery cell of claim 1, comprising:
   the first polarity terminal of the first conductive layer corresponding to a positive terminal, the first bonding element to electrically couple the positive terminal with the first electrode corresponding to an anode; and
   the second polarity terminal of the second conductive layer corresponding to a negative terminal, the second bonding element to electrically couple the negative terminal with the second electrode corresponding to a cathode.

10. The battery cell of claim 1, comprising:
a protector disposed within the head region and configured to electrically decouple the first bonding element from the first conductive disk and the second bonding element from the second conductive disk in a failure event, the protector including at least one of a current interrupt device (CID), an electrical fuse, a thermal fuse, and a printed circuit board (PCB) protection board.

11. The battery cell of claim 1, comprising:
a second insulation layer disposed in at least part of a second space defined by the sealing element, a lateral end of the neck region, and at least one of the first conductive layer and the second conductive layer, the second space different from the space for disposing the insulation layer.

12. The battery cell of claim 1, comprising:
a covering disposed on an opening of the head region of the housing opposite of the neck region to retain the sealing element within head region of the housing, the covering defining one or more openings to pass the first bonding element and the second bonding element.

13. The battery cell of claim 1, comprising:
the neck region having a protrusion between the head region and the body region of the housing, a width of the neck region less than a width of the head region and less than a width of the body region, the indentation defining the should portion for supporting the sealing element disposed in the head region.

14. The battery cell of claim 1, comprising:
the sealing element forming a hermetic seal across an inner surface of the head region of the housing to retain the electrolyte, the first electrode, and the second electrode in the body region of the housing.

15. The battery cell of claim 1, comprising:
the housing comprised of a thermally conductive material configured to thermally couple to a thermoelectric heat pump.

16. The battery cell of claim 1, comprising:
the housing having at least one of a cylindrical shape and a rectangular prismatic shape.

17. The battery cell of claim 1, comprising:
a battery pack including the battery cell and a plurality of additional battery cells, the battery pack installed in an electric vehicle.

18. A method of providing battery cells for battery packs of electric vehicles, comprising:
forming a housing for a battery cell including a body region, a neck region, and a head region;
housing, within the body region, an electrolyte, a first electrode, and a second electrode;
arranging a sealing element within the head region, the sealing element supported by a shoulder portion of the neck region;
disposing a first conductive layer within the sealing element, the first conductive layer including a first polarity terminal to electrically couple with a first bonding element connected to the first electrode, the first conductive layer defining a first opening to pass a second bonding element;
disposing a second conductive layer within the sealing element, the second conductive layer including a second polarity terminal to electrically couple with the second bonding element connected to the second electrode, the second conductive layer defining a second opening to pass the first bonding element, the second opening located in an offset position from the first opening; and
including an insulation layer in at least part of a space defined by the first conductive layer, the second conductive layer, and the sealing element.

19. The method of claim 18, comprising:
forming a first notch on a first surface of the first conductive layer, the first notch configured to fracture in a failure condition to vent pressure from the body region; and
forming a second notch on a second surface of the second conductive layer, the second notch configured to fracture in a failure condition to vent pressure from the body region.

20. A method of supplying battery cells for battery packs of electric vehicles, comprising:
providing a battery cell, the battery cell including:
a housing having a body region, a neck region, and a head region, the body region housing an electrolyte, a first electrode, and a second electrode;
a sealing element disposed in the head region and supported by a shoulder portion of the neck region;
a first conductive layer disposed within the sealing element, the first conductive layer including a first polarity terminal to electrically couple with a first bonding element connected to the first electrode, the first conductive layer defining a first opening to pass a second bonding element;
a second conductive layer disposed within the sealing element, the second conductive layer including a second polarity terminal to electrically couple with the second bonding element connected to the second electrode, the second conductive layer defining a second opening to pass the first bonding element, the second opening located in an offset position from the first opening; and
an insulation layer disposed in at least part of a space defined by the first conductive layer, the second conductive layer, and the sealing element.

* * * * *